(12) United States Patent
Yamauchi et al.

(10) Patent No.: US 7,001,296 B2
(45) Date of Patent: Feb. 21, 2006

(54) HYBRID TRANSMISSION

(75) Inventors: Yasuhiro Yamauchi, Kanagawa (JP); Toshikazu Oshidari, Kanagawa (JP); Keyvan Kargar, Versailles (FR); Yves Pichon, Boulogne-Billancourt (FR)

(73) Assignees: Nissan Motor Co., Ltd., Yokohama (JP); Renault s.a.s. societe par actions simplifiee, Boulogne-Billancourt (FR)

( * ) Notice: Subject to any disclaimer, the term of this patent is extended or adjusted under 35 U.S.C. 154(b) by 13 days.

(21) Appl. No.: 10/445,846

(22) Filed: May 28, 2003

(65) Prior Publication Data

US 2003/0224892 A1 Dec. 4, 2003

(30) Foreign Application Priority Data

May 31, 2002 (JP) ........................................ 2002-158807

(51) Int. Cl.
*F16H 3/72* (2006.01)

(52) U.S. Cl. ............................................................ 475/5
(58) Field of Classification Search ...................... 475/5, 475/10
See application file for complete search history.

(56) References Cited

U.S. PATENT DOCUMENTS

| 5,558,589 | A | | 9/1996 | Schmidt | |
| 6,371,878 | B1 | * | 4/2002 | Bowen | ........................... 475/5 |
| 6,579,201 | B1 | * | 6/2003 | Bowen | ........................... 475/5 |
| 6,732,526 | B1 | * | 5/2004 | Minagawa et al. | ........... 60/706 |
| 2003/0073534 | A1 | | 4/2003 | Oshidari et al. | |

FOREIGN PATENT DOCUMENTS

| DE | 199 09 424 A1 | 8/2000 |
| JP | 11-301291 A | 11/1999 |
| JP | 2003-034154 A | 2/2003 |
| JP | 2003-034155 A | 2/2003 |

OTHER PUBLICATIONS

U.S. Appl. No. 10/361,611, filed Feb. 11, 2003, Minagawa et al.

* cited by examiner

*Primary Examiner*—Dirk Wright
(74) *Attorney, Agent, or Firm*—Foley & Lardner LLP

(57) ABSTRACT

In a hybrid transmission, a two-degree of freedom differential unit includes four or more rotary members and is structured in such a way that, when revolution states of two rotary members from among the four or more rotary members are determined, the revolution states of the other rotary members are determined, sequentially couples the respective rotary members, in a higher revolution speed order, to one motor/generator, to one of an output to a drive system and an input from a main power source, to the other of the output and input, and to another motor/generator, and a brake is installed to fix one of the rotary members related to the input.

20 Claims, 10 Drawing Sheets

HYBRID TRANSMISSION

BACKGROUND OF THE INVENTION

1. Field of the Invention

The present invention relates generally to a, so-called, hybrid transmission for a hybrid vehicle in which a plurality of power sources such as an engine and a motor are mounted. Specifically, the present invention relates to the hybrid transmission which is capable of performing a continuously variable transmission by means of a differential unit such as a planetary gear mechanism.

2. Description of the Related Art

A Japanese Patent Application First Publication No. Heisei 11-301291 published on Nov. 2, 1999 exemplifies a previously proposed hybrid transmission. In the previously proposed hybrid transmission, two simple planetary gear groups are equipped coaxially. An engine revolution is distributed and inputted to ring gears of these planetary gear groups and, on the other hand, an output end to a vehicular road wheel drive system is coupled to carriers of both of the planetary gear groups. Two separate motor/generators are coupled to sun gears of both of the planetary gear groups. In addition, a brake enabled to fix both ring gears with the engine revolution zeroed is installed within the previously proposed hybrid transmission.

SUMMARY OF THE INVENTION

However, in the previously proposed hybrid transmission, a lever ratio on a lever diagram of the previously proposed hybrid transmission cannot be augmented due to a limitation of an enabling gear ratio. It is difficult to amplify an output torque of one of the motor/generators during an electric power vehicular run (so-called, EV run) in which road wheels are driven only by means of motor/generators without resort to the engine.

Therefore, even if both of the motor/generators are driven simultaneously, only a total torque of both of the motor/generators cannot be directed to the road wheels. During the electric run mode (EV run), each large-sized motor/generator is needed to achieve such a road wheel drive torque as demanded during the start of the vehicle. However, this is not practical.

It is, therefore, an object of the present invention to provide a hybrid transmission and its assembling method in which a differential unit is constituted by a Ravigneaux (or spelled, Ravigneawx) (type) planetary gear set to form a two-degree of freedom differential unit having four or more rotary members, a lever ratio such that a fixation of one of the rotary members related to an input thereof from among the rotary members on the lever diagram causes an output torque of each motor/generator to be amplified can be achieved, and a road wheel drive torque demanded during the electric vehicular run (EV run) without resort to a large sizing of each motor/generator.

According to one aspect of the present invention, there is provided a hybrid transmission comprising: a two-degree of freedom differential unit including four or more rotary members and structured in such a way that, when revolution states of two rotary members from among the four or more rotary members are determined, the revolution states of the other rotary members are determined; a coupling section that sequentially couples the respective rotary members, in a higher revolution speed order, to one motor/generator, to one of an output to a drive system and an input from a main power source, to the other of the output and input, and to another motor/generator; and a brake installed to fix one of the rotary members related to the input.

According to another aspect of the present invention, there is provided a method applicable to a hybrid transmission, the hybrid transmission comprising a two-degree of freedom differential unit including four or more rotary members and structured in such a way that, when revolution states of two rotary members from among the four or more rotary members are determined, the revolution states of the other rotary members are determined and the method comprising; sequentially coupling the respective rotary members, in a higher revolution speed order, to one motor/generator, to one of an output to a drive system and an input from a main power source, to the other of the output and input, and to another motor/generator; and installing a brake to fix one of the rotary members related to the input.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

(First Embodiment)

Figure 1A:
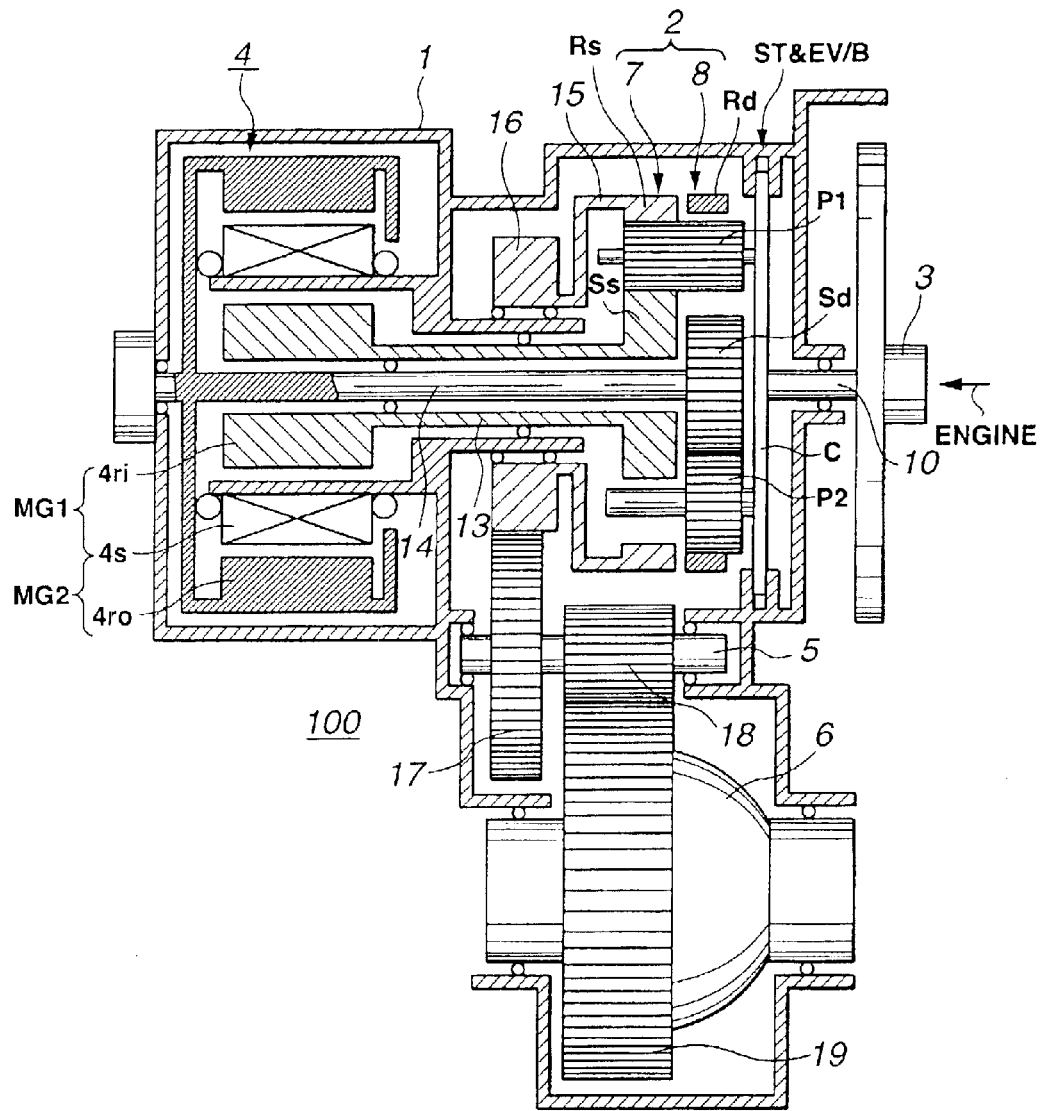
FIG. 1A is a rough longitudinally cross sectioned side view of a hybrid transmission in a first preferred embodiment according to the present invention.

FIG. 1A shows a hybrid transmission in a first preferred embodiment according to the present invention. In this embodiment, hybrid transmission generally denoted by 100 constitutes a transaxle for a front engine, front drive (so-called, abbreviated as FF) vehicle. In FIG. 1A, a reference numeral 1 denotes a transmission housing. A Ravigneaux (or Ravigneawx) planetary gear set 2 is built in transmission housing 1 at a right side in an axial direction of transmission casing 1 (leftward and rightward directions as viewed from FIG. 1A) and motor/generator couples are built in transmission casing 1 which may be constituted by, for example, a compound current two-layer motor at the leftward position thereof as viewed from FIG. 1A.

An engine (a main power source, or, so-called, a prime mover) 3 (only an engine crankshaft can be seen from FIG. 1A) is disposed at a further rightward position with respect to Ravigneaux planetary gear set 2. These Ravigneaux (type) planetary gear set 2, engine 3, and a compound current two-layer motor 4 are coaxially disposed on a principle axial line of transmission casing 1. A countershaft 5 and a differential gear unit 6, both of countershaft 5 and differential gear unit 6 being juxtaposed to the principle axial line with each predetermined offset from the principle axial line are also incorporated within transmission casing 1. Ravigneaux planetary gear set 2 includes a combination of a single pinion planetary gear group 7 and a double pinion planetary gear group 8 having a common pinion P1 and a ring gear Rs. Single pinion planetary gear group 7 is disposed at a position far way from engine 3 with respect to double pinion planetary gear group 8. Single pinion planetary gear group 7 has a sun gear Ss and ring gear Rs, each gear Ss and Rs being meshed with pinion P1. Double pinion planetary gear group 8 includes a sun gear Sd; common pinion P1; an additionally added ring gear Rd; and a large diameter pinion P2 in addition to common ring gear Rs, a large-diameter pinion P2 being meshed with three of sun gear Sd, ring gear Rd, and common pinion P1. A common carrier C rotatably supports all of pinions P1 and P2 of planetary gear groups 7 and 8. It is noted that although ring gear Rd to be added to Ravigneaux planetary gear set 2 is structurally unnecessary in this embodiment, ring gear Rd is displayed in a lever diagram shown in FIG. 1(B). Hence, this ring gear Rd is also shown in FIG. 1A for convenience.

Ravigneaux planetary gear set 2 described above includes five rotary members of sun gear Ss, sun gear Sd, ring gear Rs, ring gear Rd, and carrier C. It is noted that if revolution speeds of two rotary members from among these rotary members are determined, the revolution speeds of the other rotary members are determined. An order of a higher revolution speed of these rotary members are, as shown in the lever diagram of FIG. 1B, sun gear Sd, ring gear Rs, carrier C, ring gear Rd, and sun gear Ss from a leftmost side.

Ravigneaux planetary gear set 2 is equivalent to a planetary gear set in which ring gears of both of single pinion planetary gear group 7 and of double pinion planetary gear group 8 are coupled and carriers of both planetary gear groups are coupled.

In addition, as described above, the gear set having two degrees of freedom and five elements can be obtained by combining three single pinion planetary gear groups to constitute, as a total, nine rotary members, the nine rotary members being coupled at four portions without coupling of mutual rotary members of the individual planetary gear groups.

Compound current two-layer motor 4 includes an inner rotor 4ri, an outer rotor 4ro circularly enclosing inner rotor 4ri, both inner and outer rotors 4ri and 4ro being coaxially supported within transmission casing 1. Then, a ring-shaped (annular) coil (stator) 4s is fixed on transmission casing 1 which is arranged coaxially on an annular ring space between inner rotor 4ri and outer rotor 4ro. A first motor/generator MG1 which is an inner motor/generator MG1 constituted by annular coil 4s and inner rotor 4ri and a second motor/generator MG2 which is an outer motor/generator constituted by annular coil 4s and outer rotor 4ro. First motor/generator MG1 corresponds to one of the motor/generators and second motor/generator MG2 corresponds to the other motor/generator.

First and second motor/generators MG1 and MG2 function as motors which output revolutions (including a stop) of individual speeds in accordance with a supply current when an electric power is supplied in the form of the compound current and of individual directions in accordance with the supply current and function as generators which develop an electric power in accordance with the revolutions by means of an external force when no electric power is supplied.

Figure 1B:
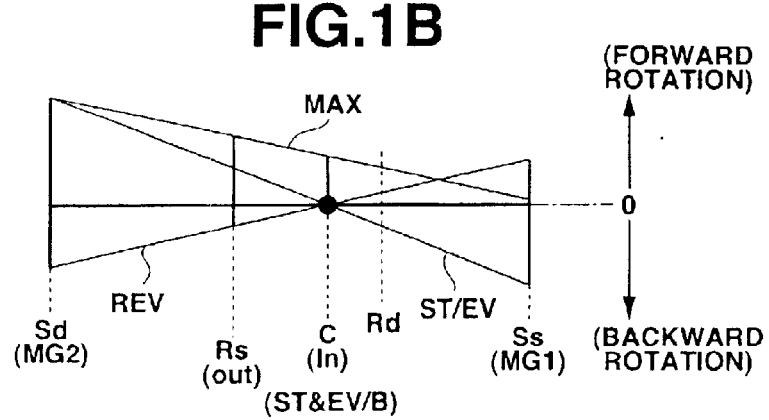
FIG. 1B is a lever diagram of the hybrid transmission in the first embodiment shown in FIG. 1B.

Rotary members constituting main components of Ravigneaux planetary gear set 2 are sun gear Sd, ring gear Rs, carrier C, and sun gear Ss, as shown in the lever diagram of FIG. 1B, in an order of higher revolution speeds, sun gear Sd being coupled to second motor/generator MG2 (outer rotor 4ro), ring gear Rs being coupled to an output (out) connected to a road wheel drive system, carrier C being coupled to an input (In) from engine 3 which is the main power source (prime mover). In addition, a brake ST&EV/B is coupled to carrier C related to the input (In), the brake ST&EV/B being furthermore clutched during a vehicular start and during an electric vehicle (EV) run, as will be described later.

The above-described couplings will hereinafter be described in great details on the basis of FIG. 1A. Since carrier C provides an input element for engine revolutions as described above, carrier C is coupled to engine (crankshaft) 3 via a transmission input shaft 10 and brake ST&EV/B is disposed between carrier C and transmission casing 1. Sun gear Ss is coupled to first motor/generator MG1 (inner rotor 4ri) via a hollow axle 13. Sun gear Sd is coupled to second motor/generator MG2 via an axle 14. Axle 14 is passed through hollow axle 13 and first motor/generator MG1 with a clearance provided therebetween. Sun gear Sd is coupled to second motor/generator MG2 (outer rotor 4ri) via axle 14. Then, ring gear Rs provides the output element to output the revolution to the road wheel drive system, as described above. An output gear 16 is coupled to ring gear Rs via hollow connecting member 15. Output gear 16 is interposed between Ravigneaux type planetary gear set 2 and compound current two-layer motor 4 and rotatably supported on transmission casing 1 and is meshed with a counter gear 17 on a counter shaft 5. A final drive pinion 18 is integrally formed on countershaft 5 and is meshed with a final drive ring gear 19 disposed on a differential gear mechanism 6. A transmission output revolution from output gear 16 is passed through counter gear 17 and, thereafter, is supplied to differential gear mechanism 6 via a final drive gear group constituted by a final drive pinion 18 and a final drive ring gear 19.

Differential gear mechanism 6 distributes the transmission output revolution to (front) left and right road wheels (not shown) of a vehicle in which the hybrid transmission in this embodiment is mounted. Output gear 16, counter gear 17, and differential gear mechanism 6 constitute the road wheel drive system. It is noted that, in the hybrid transmission shown in FIG. 1A as described above, ring gear Rd of double pinion planetary gear group 8 is not needed so that brake ST&EV/B can be disposed at the position of ring gear Rd of double pinion planetary gear group 8. Hence, even if brake ST&EV/B is coupled to one of the rotary members (viz., carrier C) related to the input (In), such cases where the whole length of transmission casing 1 becomes long and where a size in a radial direction of transmission casing 1 becomes large can be avoided.

A series of gear shift operations as described in the lever diagram of FIG. 1B in the first embodiment of hybrid transmission 100 will be described below.

First, the gear shift operation when a forward rotation output state (viz., a positive revolution output state) occurs will be described below.

When the vehicle is started to run in the forward direction, second motor/generator MG2 coupled to sun gear Sd is driven in the forward (positive) revolution output direction and first motor/generator MG1 coupled to the sun gear Ss is driven in a reverse revolution output direction so that a positive rotation at output (out)coupled to ring gear Rs is developed. During the vehicular forward start in the electric run (EV run), an output torque of each of first and second motor/generators MG1 and MG2 is amplified and the amplified torque is enabled to be directed toward output (out) at a ratio of a lever ST/EV with carrier C as a fulcrum, with sun gears Sd and Ss as power points, and with ring gear Rs as a point of application.

Since the vehicular forward start due to a large forward running torque is made possible, it becomes possible to realize the road wheel drive torque demanded during the electric run (EV run) without resort to the large sizing of first motor/generators MG1 and MG2 so that the above-described object of the present invention can be achieved.

After the vehicle is started in the forward direction, a release of brake ST&EV/B causes a fixation of carrier C to be released and the engine output caused by an appropriate start of engine 3 permits the drive of the road wheels. Thereafter, with a motor drive for first motor/generator MG1 stopped, a gear shift state is varied from the gear shift state shown by lever ST/EV toward that denoted by lever MAX shown in FIG. 1B. First motor/generator MG1 performs the electric power generation as the generator while the revolution of first motor/generator MG1 reaches to zero. A power generation force (generated output) by this first motor/generator MG1 is supplied to drive second motor/generator MG2. Hence, a vehicular run with a power income and outgo balanced can be achieved.

It is noted that, during a deceleration such that a large engine braking is needed during the forward run of the vehicle, the revolution of engine 3 is forcefully reduced via carrier C due to a re-clutching of brake ST&EV/B to carrier C. Thus, the large engine braking can be obtained as demanded in accordance with a magnitude of the re-clutching of brake ST&EV/B.

Next, the gear shift operation when the vehicle is started to run in a backward direction (during a backward (reverse) rotation output state) will be described below. That is to say, when the vehicular backward run is started, the clutching of brake ST&EV/B causes carrier C to be fixed, as shown by lever REV on the lever diagram of FIG. 1B, second motor/generator MG2 is driven in the reverse revolution output direction so that a reverse directional revolution is developed at output (out).

During the vehicular backward start due to the electric run (EV run), lever REV amplifies the output torque of each of first and second motor/generators MG1 and MG2 at a ratio of a lever with carrier C as a fulcrum, with sun gears Sd and Ss as power points, and with ring gear Rs as the point of application to be enabled to be directed toward output (out). The vehicular backward start due to the large backward running torque is made possible. In this case, the road wheel drive torque demanded during the electric run (EV run) (using motor/generators) can be realized without resort to the large sizing of first and second motor/generators MG1 and MG2. Thus, the object of the present invention can be achieved.

In this embodiment, first and second motor/generators MG1 and MG2 are, particularly, constituted by compound current two-layer motor 4 having common annular stator 4s, inner (periphery) rotor 4ri installed around an inner periphery of stator 4s, and outer (periphery) rotor 4ro installed around an outer periphery of stator 4s. Hence, since each of first and second motor/generators MG1 and MG2 can be small sized, a cost thereof can be reduced, and an efficiency of first and second motor/generators can highly be improved. Hence, an appropriate layout design of hybrid transmission 100, a low cost thereof, and an improvement in a fuel economy can be expected.

Suitable gear shift control forms of hybrid transmission shown in FIG. 1 will be described with reference to FIG. 7A through 10.

Figure 7A:
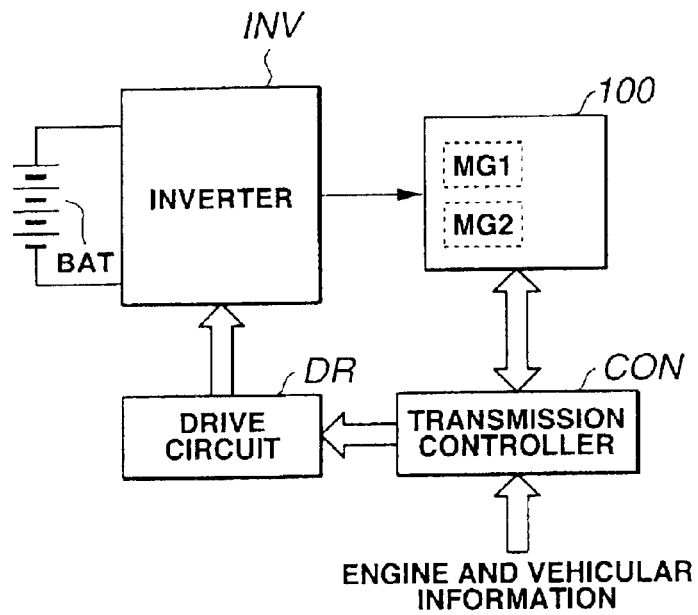
FIG. 7A is a circuit block diagram of a hybrid transmission controller and its peripheral circuit applicable to each of the first through sixth embodiments.

FIG. 7A shows a transmission controller CON for controlling the (gear) shift of hybrid transmission shown in FIG. 1A. First and second motor/generators MG1 and MG2 are connected to an inverter INV and to an inverter drive circuit DR. Inverter INV is connected to first and second motor/generators MG1 and MG2.

Figure 7B:
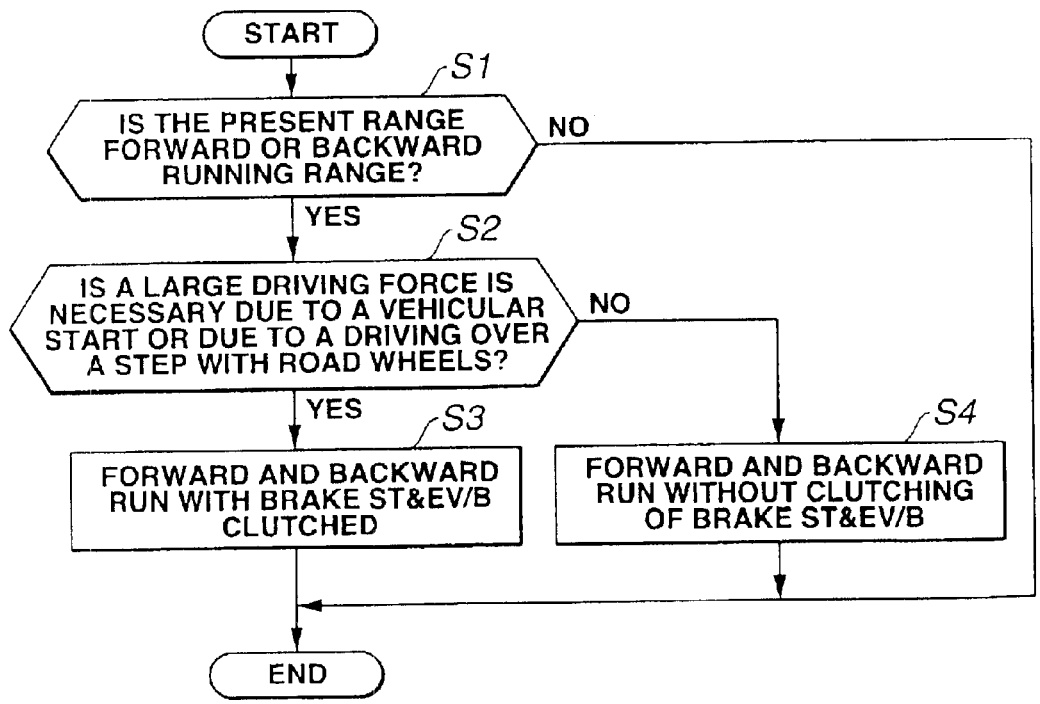
FIG. 7B is an operational flowchart representing a gear shift control program in accordance with a demanded driving force in the hybrid transmission shown in FIGS. 1A trough 6B.

FIG. 7B shows a flowchart in a (gear) shift control form having an aim of improving a start performance during the vehicular forward run or backward run. At a first step S1, controller CON determines whether the present speed range is any one of the ranges at which the vehicle runs in the forward or backward direction (for example, D range or R range) or not (no running range such as a parking range). If No at step S1, the routine is ended. If Yes, namely, the vehicle is in the forward or backward run at step S1, the routine goes to a step S2. At a step S2, controller CON determines whether a condition of a large road wheel driving force is established due to the start or due to a driving over a step with road wheels. If the large road wheel driving force is not needed (No at a step S2), the vehicle runs without clutching of brake ST&EV/B. If the large road wheel driving force is needed (Yes) at a step S2, the routine goes to a step S3. At step S3, the vehicle runs with brake ST&EV/B clutched. Thus, at the above-described lever ratio, the large road wheel driving force as is demanded is developed so as to achieve an improvement in the start performance.

Figure 8:
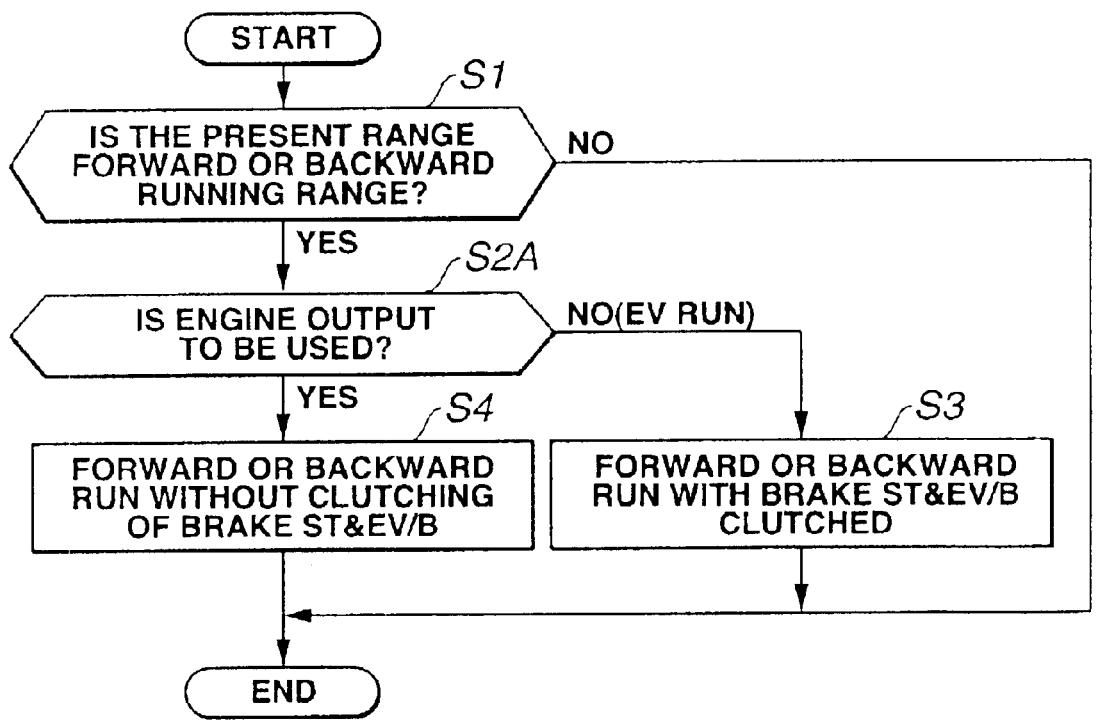
FIG. 8 is an operational flowchart representing the gear shift control program in accordance with an engine output demand.

FIG. 8 shows a control form of brake ST&EV/B during the electric (vehicle) run (EV run) only by means of the outputs from the first and second motor/generators MG1 and MG2 without resort to engine 3. At a step S1, controller CON determines if the present gear range is a range at which the vehicle runs in the forward direction or in the backward direction or not. If Yes at step S1, the routine goes to a step S2A. At step S2A, controller CON determines if the vehicle is in a state where the output of engine 3 is to be used. If Yes (the engine output is to be used) at step S2A, controller does not clutch brake ST&EV/B to run the vehicle. If No at a step S2A, controller CON clutches brake ST&EV/B to make the vehicle run. According to the clutch control of brake ST&EV/B, the clutch of brake ST&EV/B during the electric vehicular run (EV run) causes the transmission input axle 10 to be fixed. Hence, no engine drag occurs. In addition, a wasteful power consumption of electrical power can be avoided.

Figure 9:
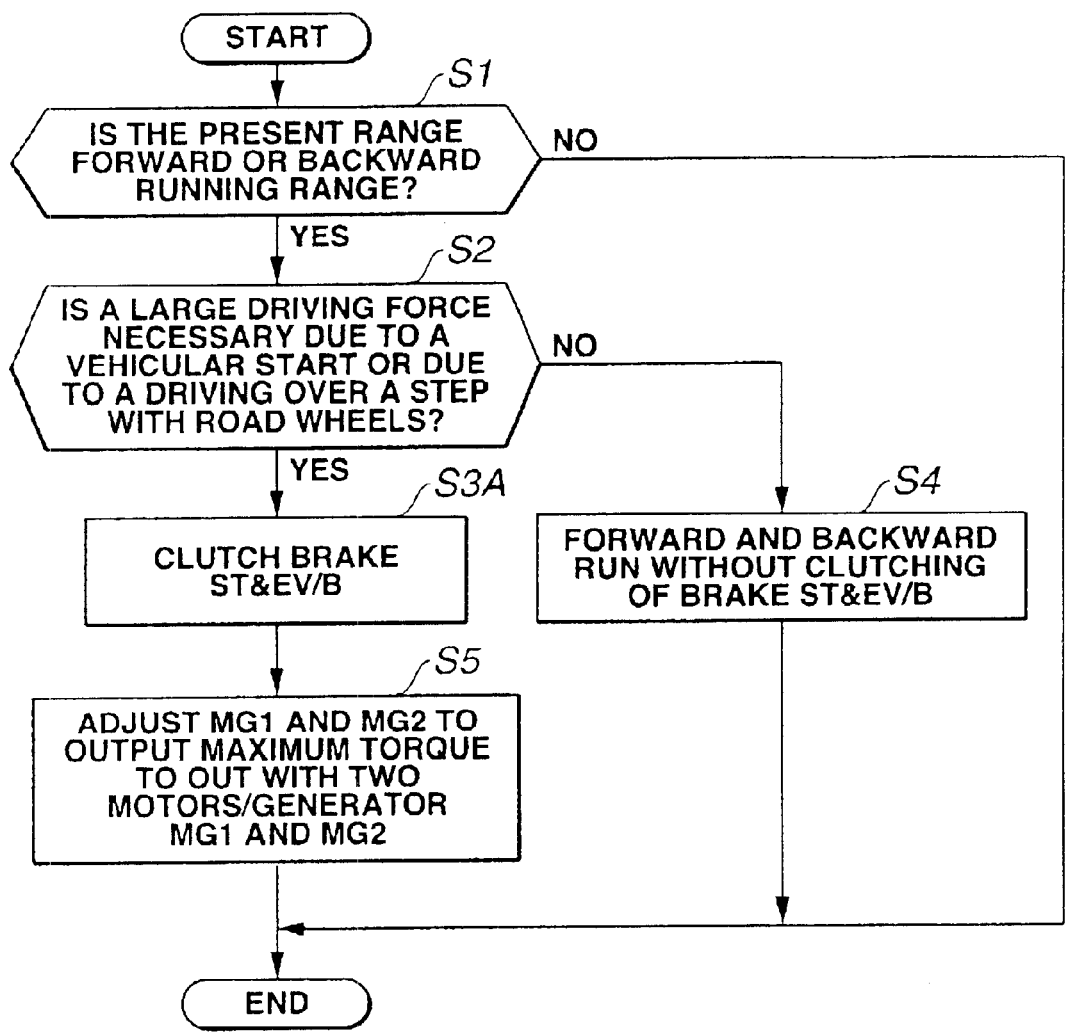
FIG. 9 is an operational flowchart representing the gear shift control program in accordance with a demanded driving force.

FIG. 9 shows a range to perform either the forward drive or backward (rearward) drive in the same way as shown in FIG. 7A.

When determining that the large driving force is needed due to the vehicular start or due to a driving over a step difference, the vehicular run with brake ST&EV/B clutched is carried out so that the large road wheel driving force as demanded is developed according to the lever ratio and the vehicle runs with brake ST&EV/B clutched. In addition, both of first and second motor/generators MG1 and MG2 are adjusted to provide a maximum torque for output (out) for two motor/generators MG1 and MG2.

Two motor/generators MG1 and MG2 are adjusted to generate a maximum torque at output (out) by means of two motor/generators MG1 and MG2. The adjustment of first and second motor/generators MG1 and MG2 means that both of first and second motor/generators MG1 and MG2 are driven so as to generate the torque in the same direction at output (out) on the lever diagram of FIG. 1B. In this case, the output torque can be amplified by means of motor/generators MG1 and MG2 at the lever ratio through the clutching of brake ST&EV/B. In this addition, the maximum torque is developed at output (out) from both of the first and second motor/generators MG1 and MG2. The vehicular start performance can more remarkably be improved without resort to the large sizing of both of the first and second motor/generators MG1 and MG2.

Figure 10:
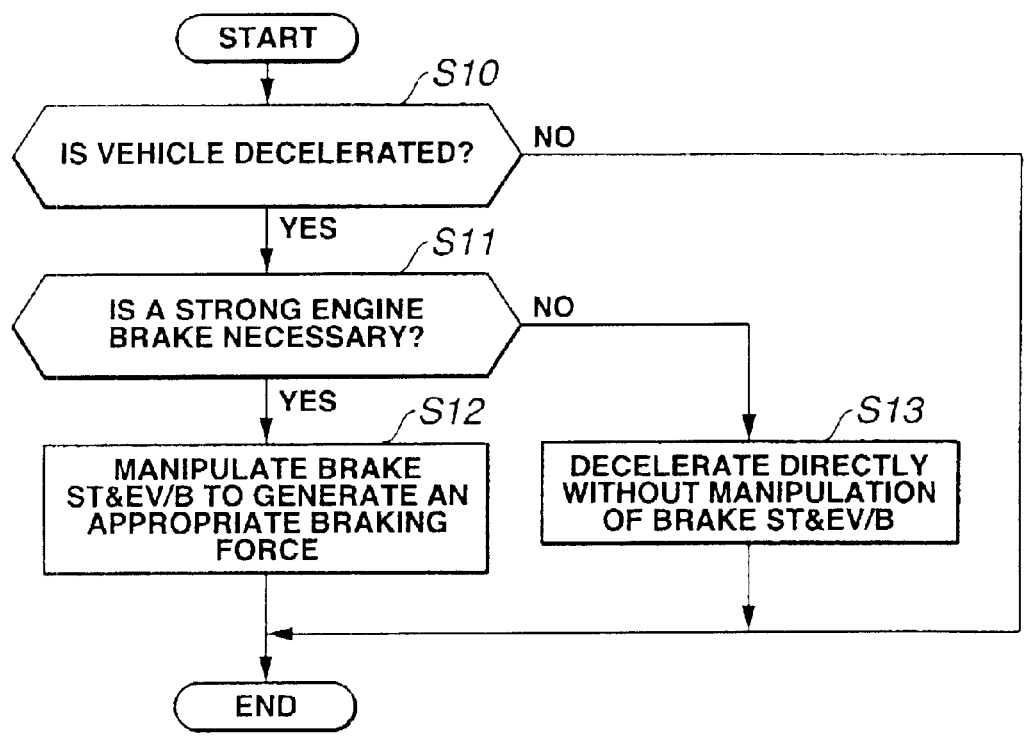
FIG. 10 is an operational flowchart representing the gear shift control program in accordance with a gear shift control program in accordance with the gear shift control during the vehicular deceleration.

FIG. 10 shows a control flowchart on brake SV&EV/B by which an engine braking in the way as demanded is obtained. At a step S10, controller CON determines whether the vehicle is decelerated. If Yes (deceleration) at step S10, the routine of FIG. 10 goes to a step S11. At step S11, controller CON determines whether the vehicle is decelerated. If Yes (decelerated) at step S10, the routine in FIG. 10 goes to a step S11. At step S11, controller CON determines if a strong engine braking is needed. If Yes, namely, the strong engine braking is needed at step S11, the routine goes to a step S12 in which brake ST&EV/B is manipulated to generate an appropriate driving force. If No, namely, the strong engine brake is not needed, brake ST&EV/B is not clutched and the deceleration is continued. The clutching of brake ST&EV/B is such that the rotation of engine 3 is forcefully reduced via carrier C. A magnitude of engine braking can be enlarged by a magnitude of clutching of brake ST&EV/B. Thus, the vehicle can be decelerated while the engine braking which meets the demand can be achieved in accordance with the magnitude of the clutching of brake ST&EV/B.

(Second Embodiment)

Figure 2A:
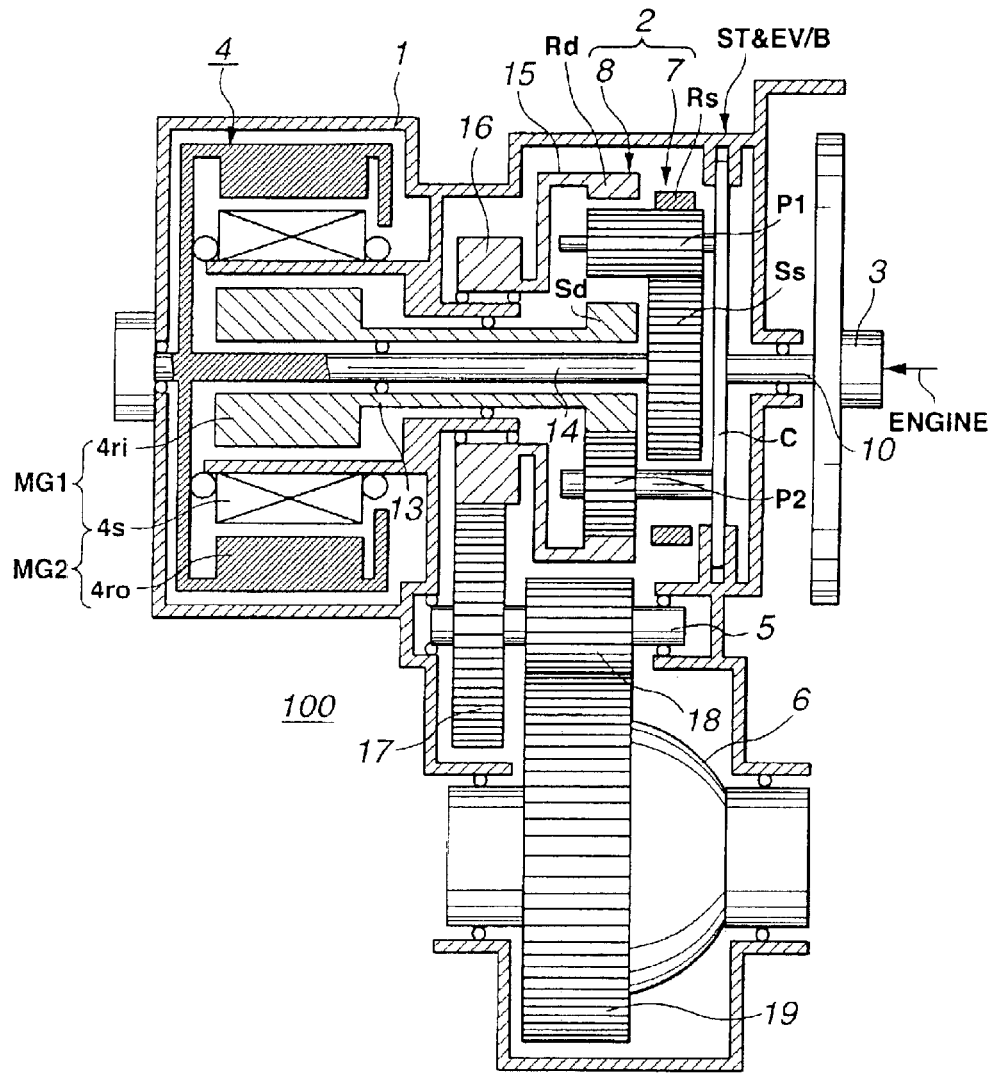
FIG. 2A is a rough longitudinally cross sectioned side view of a hybrid transmission in a second preferred embodiment according to the present invention.

FIG. 2A shows the hybrid transmission in a second preferred embodiment according to the present invention. In the second embodiment, single pinion planetary gear group 7 and double pinion planetary group 8 constituting Ravigneaux planetary gear set 2 are reversely disposed to the case of hybrid transmission 100 shown in FIG. 1A. That is to say, single pinion planetary gear group 7 is disposed at a position nearer to engine 3 than double pinion gear group 8 in a reverse arrangement thereof in the case of the first embodiment shown in FIG. 1A. Thus, as shown in the lever diagram of FIG. 2B, ring gear Rs is supposed not to be used. In this embodiment, Ravigneaux planetary gear set 2 includes five rotary members of sun gear Ss, sun gear Sd, ring gear Rs, ring gear Rd, and carrier C. The two-degree of freedom differential unit in which, when the revolution speeds of the two rotary members are determined, the revolution speeds of the other rotary members are determined is constituted by the five rotary members of Ravigneaux planetary gear set 2. The higher revolution speed order of these rotary members is, as shown in the lever diagram of FIG. 2B, sun gear Sd, ring gear Rs, carrier C, ring gear Rd, and sun gear Ss, in the same way as FIG. 1B. The rotary members constituting the main components of Ravigneaux planetary gear set 2 are sun gear Sd, carrier C, ring gear Rd, and sun gear Ss, as shown by the lever diagram shown in FIG. 2B, in the higher revolution speed order.

Figure 2B:
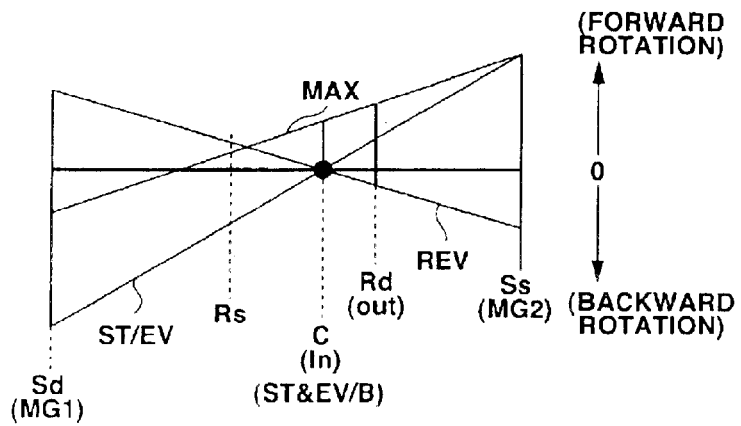
FIG. 2B is a lever diagram of the hybrid transmission in the second embodiment shown in FIG. 2A.

As shown in the lever diagram of FIG. 2B, sun gear Sd is coupled to first motor/generator MG1 (inner rotor 4*ri*), carrier C is coupled to input (In) from engine 3 which is the main power source, ring gear Rd is coupled to output (out) to road wheel drive system, and sun gear Ss is coupled to second motor/generator MG2 (outer rotor 4*ro*). Brake ST&EV/B to be clutched during the vehicular start or during the electric (EV) run is also coupled to carrier C related to input (In). This coupling will be described in details with reference to FIG. 2B. Since carrier C is the input element for the engine revolution to be inputted as described above, this carrier C is coupled to engine (crankshaft) 3 via transmission input axle 10 and brake ST&EV/B is interposed between carrier C and transmission input axle 10. Sun gear Sd is coupled to first motor/generator MG1 (inner rotor 4*ri*) via hollow axle 13. Sun gear Ss is coupled to second motor/generator MG2 (outer rotor 4*ro*) via axle 14. Axle 14 is passed through hollow axle 13 and inner rotor 4*ri* with the clearance provided between axle 14 and hollow axle 13 and inner rotor 4*ri*. Ring gear Rd as described above provides the output element which outputs the revolution to the road wheel drive system. Output gear 16 is coupled to ring gear Rd via hollow connecting member 15. The output gear coupled ring gear Rd is interposed between Ravigneaux planetary gear set 2 and compound current two-layer motor 4 and is rotatably supported in transmission casing 1 and is meshed with counter gear 17 on countershaft 5 constituting the road wheel drive system. It is noted that, in hybrid transmission 100 described above, ring gear Rs of single pinion planetary gear group 7 is not needed. Since brake ST&EV/B can be installed at this position, the whole length of transmission can be avoided from being elongated and the radial directional large sizing can be avoided.

Hybrid transmission in the second embodiment carries out the (gear) shift operation as shown by the lever diagram of FIG. 2B.

The gear shift operation during the forward (positive) rotation output state will be described below. When the vehicle is started in the forward direction, the clutching of brake ST&EV/B causes carrier C to be fixed as shown by lever ST/EV on the lever diagram shown in FIG. 2B. Together with the drive of second motor/generator MG2 in the positive revolution output direction, first motor/ generator MG1 is driven in the reverse revolution output direction. Thus, the positive (forward) rotation at output (Out) is developed. During the forward start in the electric run (EV run), the output torque of each motor/generator MG2 and MG1 is amplified at a ratio of lever with carrier C as a fulcrum, with sun gears Ss and Sd as power points, ring gear Rd as a point of application and the amplified torque is enabled to be directed to output (out).

The forward start of the vehicle by means of the large forward torque is made possible. Hence, it becomes possible to realize the forward start of the vehicle by means of the large forward running torque so that the road wheel drive torque demanded during the electric run (EV run) can be realized without resort to the large sizing of each motor/generator MG1 and MG2. The object of the present invention can, thus, be achieved.

After the forward start of the vehicle, the release of brake ST&EV/B causes the fixation of carrier C to be released so that an appropriate start of engine 3 permits the drive of wheels by means of an engine output. Thereafter, with the motor drive of first motor/generator MG1 stopped, the shift state is varied from the gear shift state shown by lever ST/EV to the shift state shown by lever MAX on the lever diagram of FIG. 2B. During this variation, first motor/generator MG1 carries out power generation as the generator. The generated output (electric power) from second motor/generator MG2 serves to drive second motor/generator MG2 so that it becomes possible to make the vehicular run with income and outgo of power balanced.

It is noted that, during the large deceleration requiring the large engine braking in the forward vehicular run, the re-clutching of brake ST&EV/B causes the rotation of engine 3 to be forcefully reduced via carrier C. Thus, the large engine braking in the way as is demanded can be achieved in accordance with the magnitude of re-clutching of brake ST&EV/B.

Next, the (gear) shift operation when the backward (reverse) rotation output start occurs will be described below. When the vehicle is started in the backward direction, the clutching of brake ST&EV/B causes carrier C to be fixed, second motor/generator MG2 is driven in the reverse revolution output direction, first motor/generator MG1 is driven in the positive revolution output direction so that a reverse rotation of output (out) is developed. During the reverse start by means of the electric run (EV run), lever REV amplifies output torque of first and second motor/generators MG1 and MG2 at the lever ratio with carrier C as the fulcrum, with sun gears Ss and Sd as power points, with ring gear Rd as the point of application and the amplified torque is enabled to be directed toward output (out). The vehicular reverse (backward) start by means of the large backward running torque is made possible. In this case, the realization of the road wheel drive torque as demanded during the electric run becomes possible without resort to the large sizing of first and second motor/generators MG1 and MG2. Thus, the object of the present invention can be achieved. It is noted that, in the case of hybrid transmission 100 in the second embodiment, the (gear) shift control can be carried out in the same way as described with reference to FIGS. 7A through 10. Thus, the same action and advantages can be achieved.

(Third Embodiment)

Figure 3:
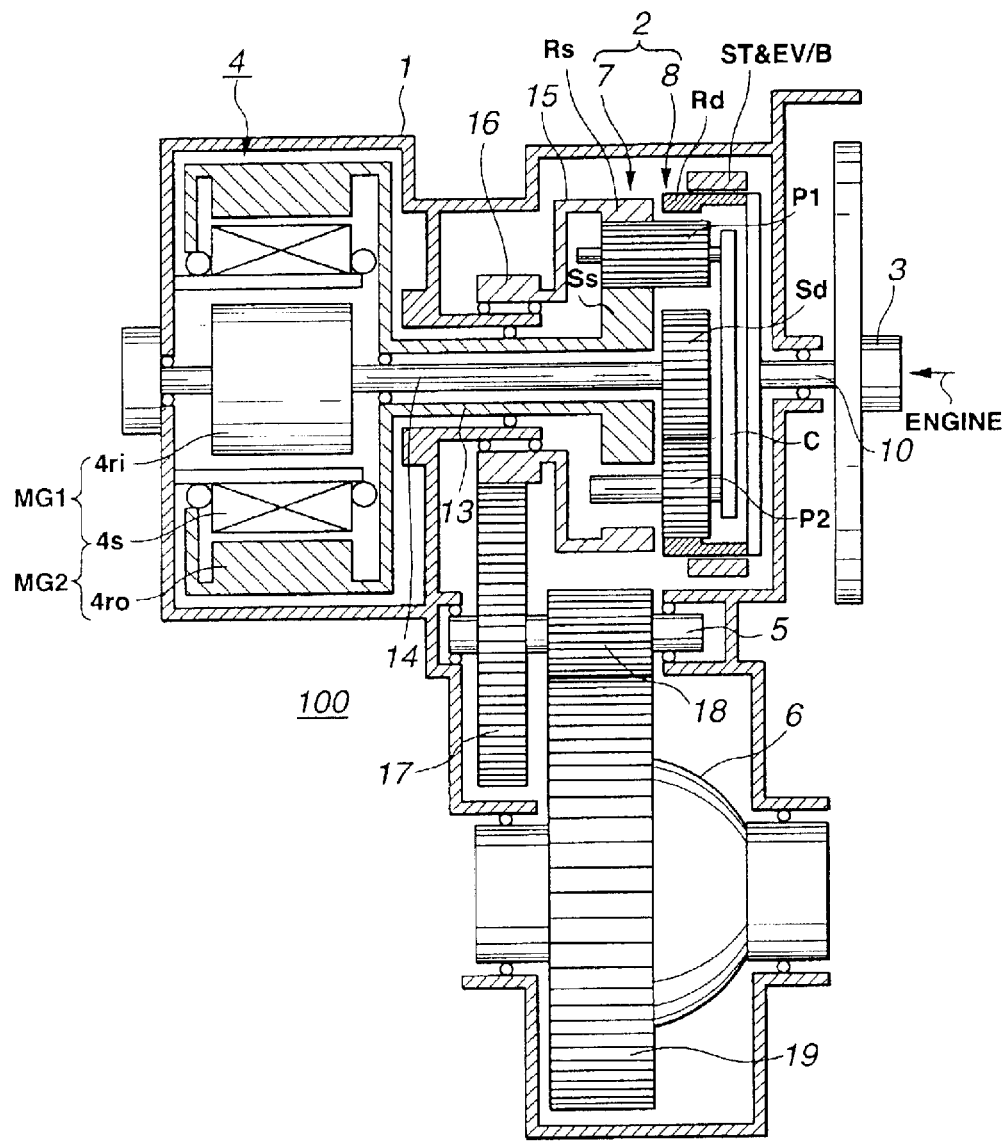
FIG. 3A is a rough longitudinally cross sectioned side view of the hybrid transmission in a third preferred embodiment according to the present invention.
FIG. 3B is a rough longitudinally cross sectioned side view of the hybrid transmission in the third embodiment according to the present invention shown in FIG. 3A.
Figure 3:
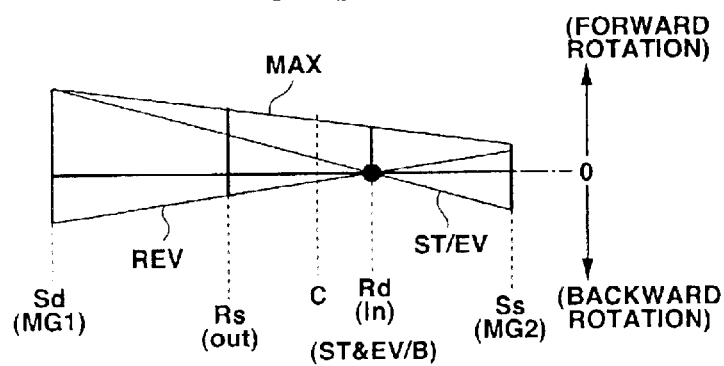

FIG. 3A shows the hybrid transmission in a third preferred embodiment according to the present invention. In this embodiment, the arrangement of single pinion planetary gear group 7 and double pinion planetary gear group 8 constituting Ravigneaux planetary gear set 2 is generally the same as shown in FIG. 1A. However, in this embodiment, engine 3 is not coupled to carrier C but is coupled to ring gear Rd of double pinion planetary gear group 8. Carrier C is not used as shown in the lever diagram of FIG. 3B. The coupling relationships between sun gears Ss and Sd and motor/generators MG1 and MG2 are reversed to the case of FIG. 1A. In this embodiment, Ravigneaux planetary gear set 2 constitutes the two-degree of freedom differential unit structured in such a way that, when the revolution speeds of two rotary members are determined, the revolution speeds of the other rotary members are determined. The revolution speed order of these rotary members, in this embodiment, is such an order as sun gear Sd (fastest), ring gear Rs, carrier C, ring gear Rd, and sun gear Ss (slowest), in the same order as those shown in FIG. 1B.

The rotary members constituting the main components of Ravigneaux planetary gear set 2 are sun gear Sd, ring gear Rs, carrier C, ring gear Rd, and sun gear Ss in the revolution speed order, as shown by the lever diagram of FIG. 3B, sun gear Sd being coupled to first motor/generator MG1 (inner rotor 4ri), ring gear Rs being coupled to output (out) to the road wheel drive system, ring gear Rd being coupled to input (In) from engine 3 which is the main power source (prime mover), and sun gear Ss being coupled to second motor/generator MG2 (outer rotor 4ro). Brake ST&EV/B to be clutched during the vehicular start and during electric (EV) run is coupled to ring gear Rd related to input (In).

The above-described couplings will be described with reference to FIG. 3A. Ring gear Rd provides the input element to which the engine revolution is inputted. This ring gear Rd is coupled to engine (crankshaft) 3 via transmission input axle 10. Brake ST&EV/B is interposed between ring gear Rd and transmission casing 1. Sun gear Ss is coupled to second motor/generator MG2 (outer rotor 4ro) via hollow axle 13. Sun gear Sd is coupled to first motor/generator MG1 (inner rotor 4ri) via axle 14. Axle 14 is passed through hollow axle 13 with a clearance therebetween. Ring gear Rs provides the output element which outputs the revolution to road wheel drive system in the same way as FIG. 1A. Output gear 16 is coupled to ring gear Rs via hollow connecting member 15. Output gear 16 is interposed between Ravigneaux planetary gear set 2 and compound current two-layer motor 4. Output gear 16 is rotatably supported on transmission casing 1 and is meshed with counter gear 17 on counter shaft 5 constituting the road wheel drive system. In hybrid transmission 100 described above, brake ST&EV/B is constituted by a band brake so as to be wound on ring gear Rd so that the whole length of hybrid transmission 100 can be avoided from being elongated according to a design of brake ST&EV/B.

The gear shift operation during the forward (positive) revolution output state in the third embodiment of hybrid transmission 100 will be described below with reference to the lever diagram of FIG. 3B. When the vehicle is started to run in the forward direction during the electric (EV) run, lever ST/EV serves to amplify the output torque of first and second motor/generators MG1 and MG2 at a lever ratio determined with ring gear Rd as the fulcrum, with sun gears Sd and Ss as power points, with ring gear Rs as the point of application and the amplified output torque described above is enabled to be directed to output (out). The forward start of the vehicle due to the large forward running torque can be achieved. Hence, the road wheel drive torque as demanded during the electric (EV) run can be realized without resort to the large sizing of first and second motor/generators MG1 and MG2. Thus, the above-described object can be achieved.

After the vehicular forward start is carried out, the release of brake ST&EV/B causes the fixation of ring gear Rd to be released. An appropriate start of engine 3 permits the road wheel drive according to the engine output. Thereafter, with the motor drive of second motor/generator MG2 stopped, the gear shift state is changed from the gear shift state shown by lever ST/EV toward the gear shift state shown by lever MAX in the lever diagram of FIG. 3B. While the revolution of second motor/generator MG2 is reduced to zero, second motor/generator MG2 performs the power generation as the generator. The vehicular run with the power income and outgo balanced becomes possible when the generated output of second motor/generator MG2 serves to drive the first motor/generator MG1 under the state wherein the power income and outgo is balanced.

It is noted that, during the deceleration requiring the large engine braking during the forward run, are-clutching of brake ST&EV/B causes the revolution of engine (crankshaft) 3 to be forcefully reduced via ring gear Rd. Thus, a large engine braking can be obtained in the way as described in accordance with the magnitude of the re-clutching of brake ST&EV/B.

Next, the (gear) shift operation during the backward (reverse) rotation output state will be described below. When the vehicle is started to run in the backward direction, the clutching of brake ST&EV/B causes ring gear Rd to be fixed. Under this state, first motor/generator MG1 is driven in the reverse revolution output direction and second motor/generator MG2 is driven in the positive revolution direction so that the reverse directional revolution is developed at output (out).

During the reverse start in the related electric (EV) run, lever REV serves to amplify the output torque of each of first and second motor/generator MG1 and MG2 so as to be enabled to be directed to output (out at the lever ratio determined with ring gear Rd as the fulcrum, with sun gears Sd and Ss as power points, and with ring gear Rs as the point of application. Since the reverse (backward) vehicular start by means of the large backward running torque can be achieved. In this case, the realization of the road wheel drive torque as demanded during the electric (EV) run can be achieved without resort to the large sizing of motor/generators MG1 and MG2. Consequently, the above-described object according to the present invention can be achieved. In the case of the hybrid transmission in the third embodiment, the (gear) shift control can be executed in the same way as described with reference to FIG. 7A through 10. The same action and advantages can be achieved.

(Fourth Embodiment)

Figure 4A:
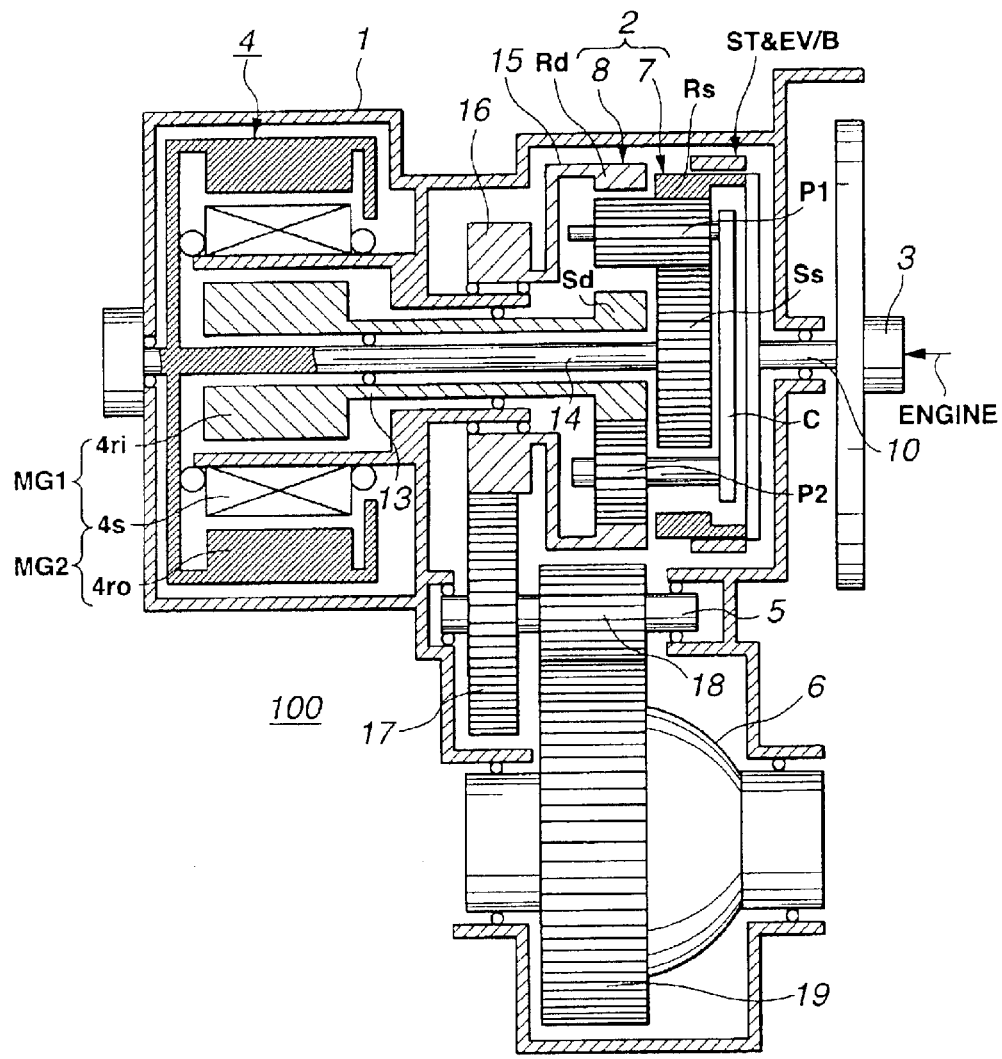
FIG. 4A is a rough longitudinally cross sectioned side view of the hybrid transmission in a fourth embodiment according to the present invention.
Figure 4B:
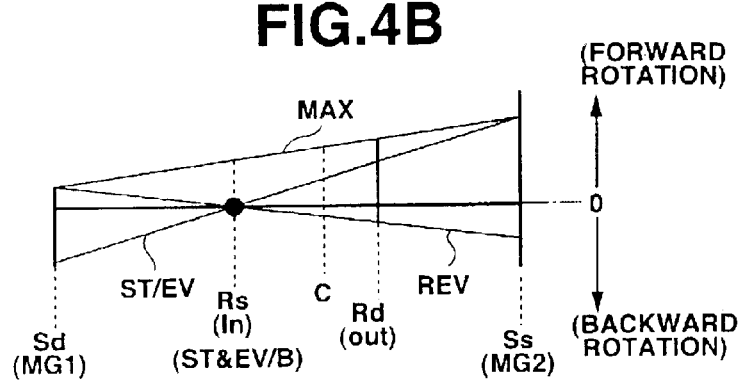
FIG. 4B is a rough longitudinally cross sectioned side view of the hybrid transmission in the fourth embodiment according to the present invention shown in FIG. 4A.

FIG. 4A shows a fourth preferred embodiment of the hybrid transmission according to the present invention. In the fourth embodiment, the arrangement of single pinion planetary gear group 7 and double pinion planetary gear group 8 constituting Ravigneaux planetary gear set 2 is the same as described in the second embodiment in FIG. 2A. The coupling relationship between sun gears Ss and Sd and first and second motor/generators MG1 and MG2 are the same as the case of FIG. 2A. However, carrier C is not coupled to engine (crankshaft) 3. Ring gear Rs provides the input element to which the engine revolution is inputted and is coupled to engine 3 via transmission axle 10. Carrier C is not used as shown in the lever diagram of FIG. 4B. Brake ST&EV/B is interposed between ring gear Rs and transmission casing 1. The lever diagram in this embodiment is represented as shown in FIG. 4B. Ravigneaux planetary gear set 2 constitutes the two-degree of freedom differential unit having five rotary members. The revolution speed order in these rotary members is sun gear Sd, ring gear Rs, carrier C, ring gear Rd, and sun gear Ss in the same way as shown in the lever diagram of FIG. 1B. The rotary members constituting the main components of Ravigneaux planetary gear set 2 are sun gear Sd, ring gear Rd, and sun gear Ss, in the higher revolution order, as shown in the lever diagram of FIG. 4B, sun gear Sd being coupled to first motor/generator MG1 (inner rotor 4ri), ring gear Rs being coupled to input (In) from engine 3 which is the main power source, ring gear Rd being coupled to output (out) to the road wheel drive system, and sun gear being coupled to second motor/generator (outer rotor 4ro) MG2. Brake ST&EV/B to be clutched during the vehicular start and during the electric (EV) run is coupled to ring gear (Rs) related to input (In). In hybrid transmission 100, brake ST&EV/B is constituted by a band brake so as to be wound on ring gear Rs. This brake permits the whole length of hybrid transmission to be avoided from being elongated.

The gear shift operation in hybrid transmission 100 of the fourth embodiment will be described below. First, during the vehicular forward start in the electric run (EV), the output torque of each of first and second generators MG1 and MG2 is amplified at a ratio of lever ST/EV determined with ring gear Rs as the fulcrum, with sun gears Ss and Sd as the power points, and with ring gear Rd as the point of application and the amplified torque is enabled to be directed toward output (out). Thus, the vehicular forward run with the large forward running torque can become possible. Hence, the vehicular forward run with the large forward running torque can become possible. Hence, the road wheel drive torque demanded during the electric (EV) run can be obtained without resort to the large sizing of first motor/generators MG1 and MG2. Thus, the above-described object can be achieved. After the vehicular forward run is started, the release of brake ST&EV/B releases the fixation of ring gear Rs. Thus, the appropriate start of engine 3 permits the drive of road wheels even through engine output. Thereafter, first motor/generator MG1 is stopped. At this time, the gear shift state is changed from that shown by lever ST/EV in FIG. 4B toward lever MAX shown by lever MAX in FIG. 4B. While the rotation of first and second motor/generator MG1 reduced toward zero, first motor/generator MG1 serves to drive second motor/generator MG2 so that the vehicular run with power income and outgo balanced becomes possible. It is noted that, during the deceleration requiring the large engine braking during the forward run, the revolution of engine 3 is forcefully reduced via ring gear Rs. Thus, the large engine braking as demanded in accordance with the magnitude of the re-clutching of brake ST&EV/B can be obtained.

Next, the gear shift operation during the backward (reverse) revolution output state will be described below. When the vehicle is started to run in the backward direction, the clutching of brake ST&EV/B causes ring gear Rs to be fixed, as shown by lever REV on the lever diagram of FIG. 4B, second motor/generator MG2 is driven in the reverse revolution output direction, and first motor/generator MG1 is driven in the positive revolution output direction so that the reverse rotation of output (out) is developed. During the above-described backward run start in the electric (EV) run, lever REV serves to amplify the output torque of each of first and second motor/generators MG1 and MG2 at a lever ratio determined with ring gear Rs as the fulcrum, sun gears Ss and Sd as power points, and with ring gear Rd as point of application, and the amplified torque is enabled to be directed toward output (out). The backward start with the large backward running torque can be carried out. Hence, in this case, the road wheel drive torque demanding when the vehicle runs in the electric (EV) run can be realized without resort to the large sizing of motor/generators MG1 and MG2. The above-described object can, thus, be achieved. In the case of the hybrid transmission according to the present invention, the (gear) shift control described with reference to FIGS. 7A through 10 can also be carried out in this embodiment. Thus, the same action and advantages as described in the first embodiment can also be achieved in the fourth embodiment.

(Fifth Embodiment)

Figure 5A:
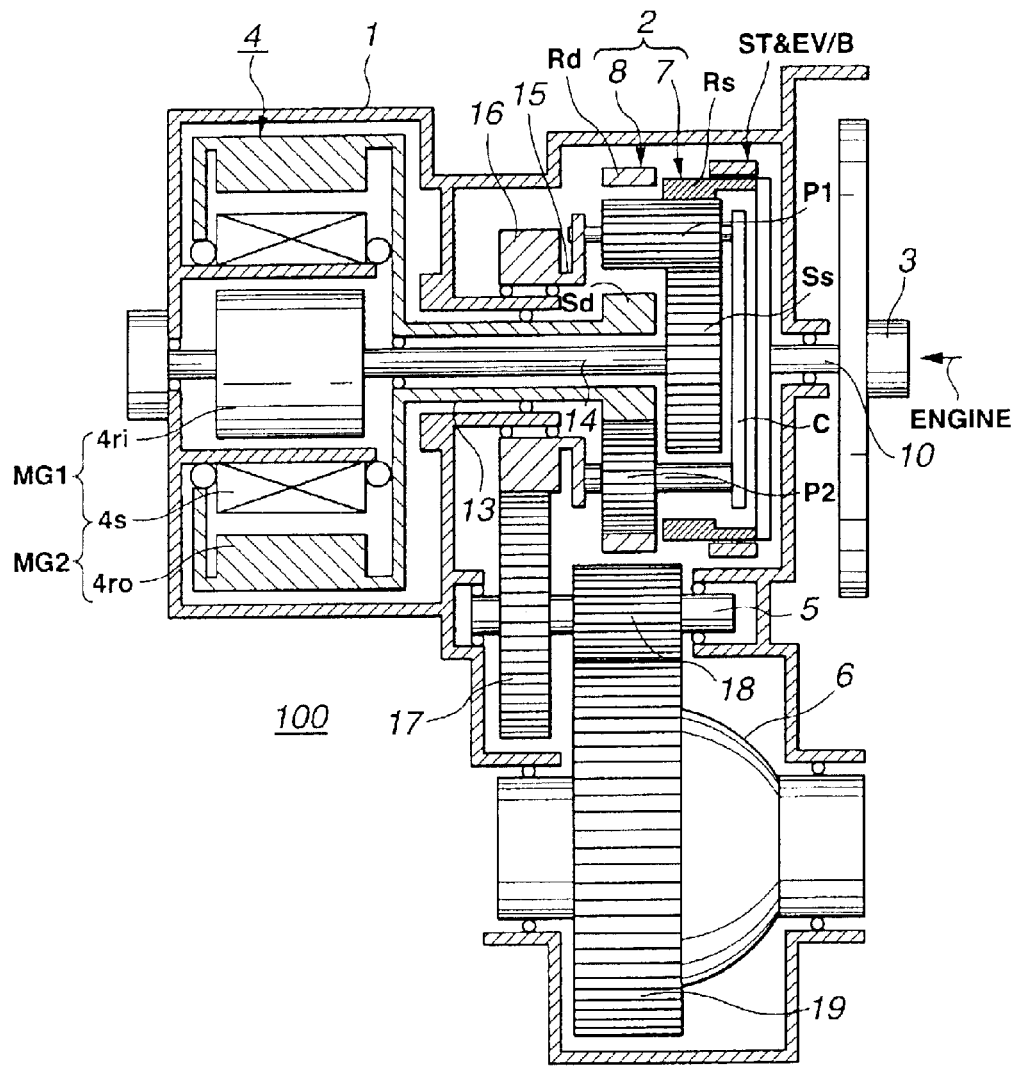
FIG. 5A is a rough longitudinal cross sectioned side view of the hybrid transmission in a fifth preferred embodiment according to the present invention.
Figure 5B:
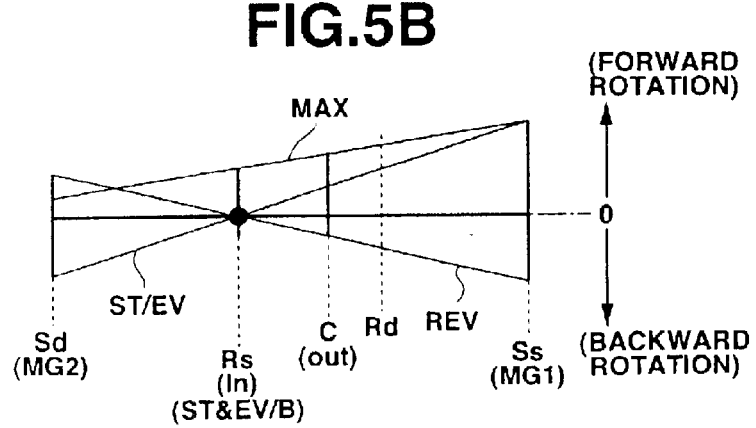
FIG. 5B is a lever diagram of the hybrid transmission in the fifth embodiment according to the present invention shown in FIG. 5A.

FIG. 5A shows hybrid transmission 100 in a fifth preferred embodiment according to the present invention. In the fifth embodiment, the arrangement of single pinion planetary gear group 7 and double pinion planetary gear group 8 constituting Ravignaux type planetary gear group set 2 and the structures of input (In) from engine 3 coupled to ring gear Rs and brake ST&EV/B are the same as those shown in FIG. 4A. The following points are different from the structure of hybrid transmission (100) in the fourth embodiment shown in FIG. 4A. That is to say, sun gear Sd is coupled to second motor/generator MG2 via hollow axle 13. Sun gear Ss is coupled to first motor/generator MG1 via axle 14. Axle 14 is passed through hollow axle 13 with the clearance provided therebetween. In addition, output gear 16 is not coupled to ring gear Rd and output gear 16 is coupled to carrier C via connecting member 15. Ring gear Rd is not used as shown by the lever diagram of FIG. 5B. The lever diagram, in this case, is represented by FIG. 5B. Ravignaux planetary gear set 2 is constituted by two-degree of freedom differential unit having five rotary members. The revolution speed order of these rotary members is sun gear Sd (fastest), ring gear Rs, carrier C, ring gear Rd, and sun gear Ss (slowest) in the same way as described in the lever diagram of FIG. 1B. The rotary members which constitutes main components of Ravignaux planetary gear set 2 are sun gear Sd, ring gear Rs, carrier C, and sun gear Ss in the revolution speed order as shown by the lever diagram of FIG. 5B, sun gear Sd being coupled to second motor/generator MG2 (outer rotor 4ro), ring gear Rs being coupled to input (In) from engine 3 which provides the main power source (prime mover), carrier C being coupled to output (out) to the road wheel drive system, and sun gear Ss being coupled to first motor/generator MG1 (inner rotor 4ri). Ring gear Rs related to input (In) is, furthermore, coupled to brake ST&EV/B to be clutched during the vehicular start or during the electric (EV) run.

Hybrid transmission 100 in the fifth embodiment carries out the (gear) shift operation as shown in the lever diagram of FIG. 5B.

First, the gear shift operation during the forward (positive) revolution output state will be described below. When the vehicle is started to run in the forward direction, as shown by lever ST/EV of FIG. 5B, the clutching of brake ST&EV/B causes ring gear Rs to be fixed. Under this state, first motor/generator MG1 is driven in the positive revolution output direction and second motor/generator MG2 is driven in the reverse revolution output direction so that the positive directional revolution is developed at output (out).

When the vehicle is started to run in the forward direction in the electric (EV) run, lever ST/EV serves to amplify the output torque of each of first and second motor/generators MG1 and MG2 to be enabled to be directed toward output (out) at a ratio of lever ST/EV determined with ring gear Rs as the fulcrum, with sun gears Ss and Sd as power points, and with carrier C as the point of application. Thus, the forward start by means of the large forward running torque can become possible. For road wheel drive torque demanded when the vehicle runs in the electric (EV) run can be realized without resort to the large sizing of first and second motor/generators MG1 and MG2. Thus, the above-described object can be achieved.

After the vehicle is started to run in the forward direction, release of brake ST&EV/B releases the fixation of ring gear Rs so that the appropriate start of engine 3 permits the drive of the road wheels. Thereafter, since the motor drive of second motor/generator MG2 is stopped, the (gear) shift state is varied from that shown by lever ST/EV toward lever MAX shown in FIG.5B. While the revolution of second motor/generator MG2 is reduced toward zero, second motor/generator MG2 functions as the generator. At this time, the generated output of second motor/generator MG2 serves to drive first motor/generator MG1 so that it becomes possible to run with the power income and outgo balanced. It is noted that, during the deceleration requiring the large engine braking during the forward vehicular run, the re-clutching of brake ST&EV/B causes the revolution of engine 3 to be forcefully reduced. Thus, the large engine braking as demanded in accordance with the magnitude of thereclutching of brake ST&EV/B can be achieved.

Next, the gear shift during the backward run (reverse) revolution output state will be described below. When the vehicle is started to run in the backward direction, as shown by lever REV in the lever diagram of FIG. 5B, the clutching of brake ST&EV/B causes ring gear Rs to be fixed. Under this state, first motor/generator MG1 is driven in the reverse revolution output direction and second motor/generator MG2 is driven in the positive revolution output direction so that the reverse directional revolution is developed at output. During the backward vehicular start in the electric (EV) run, lever REV serves to amplify output torque of each of first and second motor/generators MG1 and MG2 at the lever ratio with ring gear Rs as the fulcrum, with sun gears Ss and Sd power points, and with carrier C as the point of application, and the amplified torque is enabled to be directed toward output (out). The backward vehicular start becomes possible with the large backward running torque. In this case, the realization of the road wheel drive torque demanding during the electric (EV) run without resort to the large sizing of the first and second motor/generators MG1 and MG2 becomes possible. The above-described object can, thus, be achieved.

In the case of the hybrid transmission according to the present invention, the (gear) shift control described with reference to FIGS. 7A through 10 can also be carried out in this embodiment. Thus, the same action and advantages as described in the first embodiment can also be achieved in the fifth embodiment.

(Sixth Embodiment)

Figure 6A:
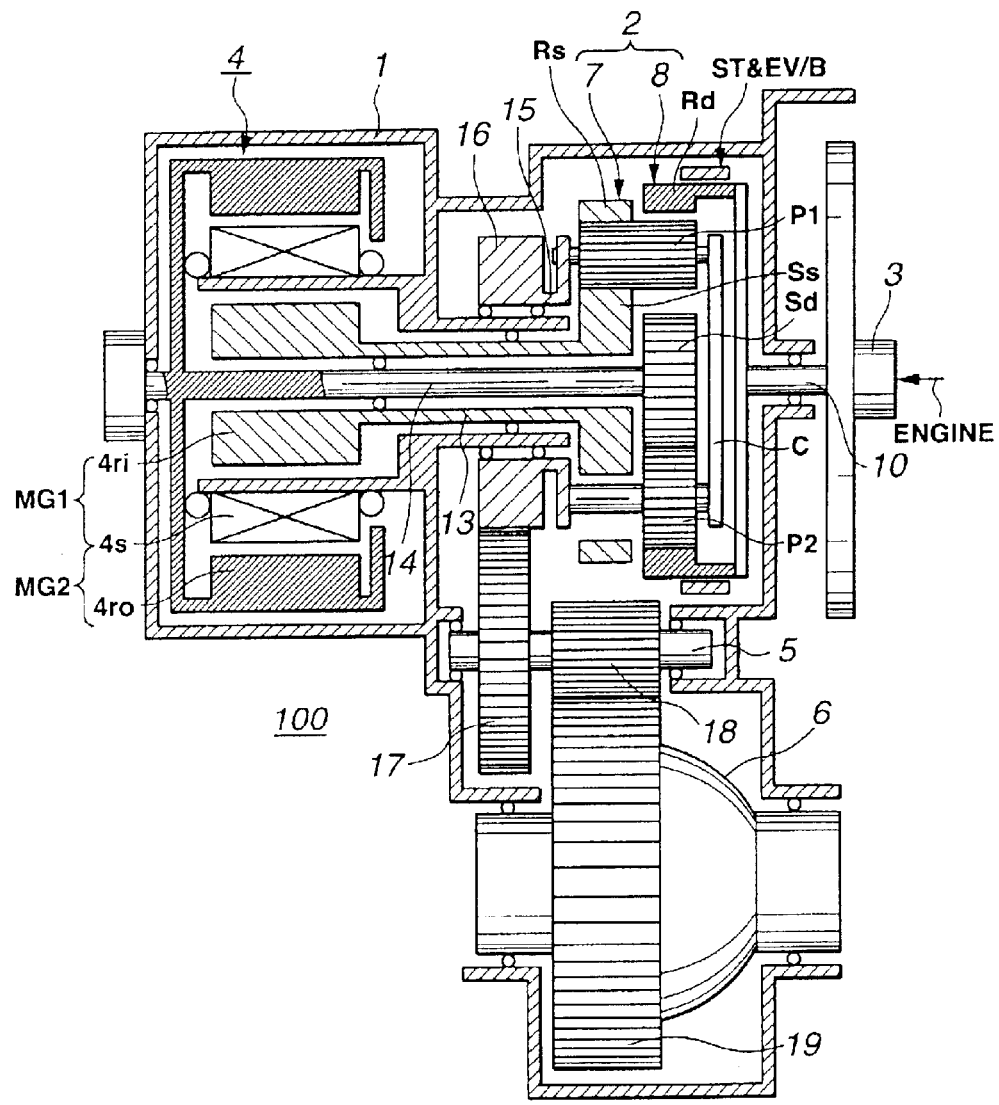
FIG. 6A is a rough longitudinal cross sectioned side view of the hybrid transmission in a sixth preferred embodiment according to the present invention.

FIG. 6A shows the hybrid transmission in a sixth preferred embodiment according to the present invention. In the sixth embodiment shown in FIG. 6A, the structure of hybrid transmission 100 is generally the same as that in the fifth embodiment shown in FIG. 5A. However, the following difference points are present. The arrangement of single pinion planetary gear group 7 and double pinion planetary gear group 8 constituting Ravigneaux planetary gear set 2 is the reverse to the case of the fifth embodiment shown in FIG. 5A.

Hence, engine (crankshaft) 3 is coupled to ring gear Rd via transmission input axle 10 so that input (In) from engine 3 and brake ST&EV/B are coupled to ring gear Rd. Brake ST&EV/B is interposed between ring gear Rd and transmission casing 1. Brake ST&EV/B is constituted by the band brake wound on ring gear Rd. Sun gear Ss is coupled to first motor/generator MG1 (inner rotor 4ri) via hollow axle 13. Sun gear Sd is coupled to second motor/generator MG2 (outer rotor 4ro) via axle 14. Axle 14 is, in this embodiment, passed through first motor/generator MG1 (inner rotor 4ri) and hollow axle 13 with the clearance provided between axle 14 and inner rotor 4ri and between axle 14 and hollow axle 13, as shown in FIG. 6A. Output gear 16 is coupled to carrier C via connecting member 15. Ring gear Rs is not used as shown by the lever diagram of FIG. 6B.

Figure 6B:
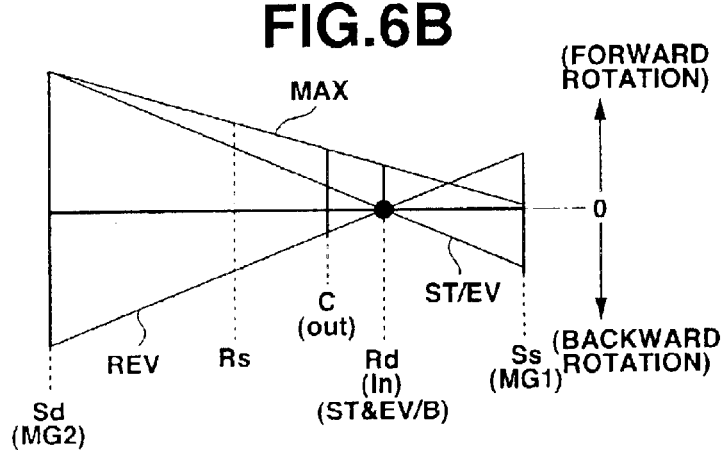
FIG. 6B is a lever diagram of the hybrid transmission in the sixth preferred embodiment according to the present invention shown in FIG. 6A.

The lever diagram in this embodiment is represented by FIG. 6B. Ravigneaux planetary gear set 2 is provided with five rotary members and constitutes the differential unit having the two degrees of freedom.

The revolution speed order of these rotary members is sun gear (fastest) Sd, ring gear Rs, carrier C, ring gear Rs, carrier C, ring gear Rd, and sun gear Ss (slowest) in the same way as shown in the lever diagram of FIG. 1B. Rotary members constituting the main components of Ravigneaux type planetary gear set 2 are sun gear Sd, carrier C, ring gear Rd, sun gear Ss in the revolution speed order, as shown in the lever diagram of FIG. 6B, sun gear Sd being coupled to second motor/generator MG2 (outer rotor 4ro), carrier C being coupled to output to the road wheel drive system, ring gear Rd being coupled to input (In) from engine 3 which provides the main power source (prime mover), and sun gear Ss being coupled to first motor/generator MG1 (inner rotor 4ri). Brake ST&EV/B to be clutched during the vehicular start and during the electric (EV) run is coupled to ring gear Rd coupled to input (In) from engine 3.

Hybrid transmission 100 in the sixth embodiment carries out the (gear) shift operation as shown in the lever diagram of FIG. 6B.

First, the gear shift operation during the forward (positive) revolution output state will be described. When the vehicle is started to run in the forward run direction, as shown by lever ST/EV on the lever diagram of FIG. 6B, the clutching of brake ST&EV/B causes ring gear Rd to be fixed. Under this state, second motor/generators MG2 is driven in the positive revolution output direction and first motor/generator MG1 is driven in the reverse revolution output direction so that the positive directional revolution is developed at the output (out).

When the vehicle is started to run during the electric (EV) run, lever ST/EV serves to amplify the output torque of each of first and second motor/generators MG1 and MG2 and the amplified output is enabled to be directed toward output (out). Hence, the forward vehicular start due to the large forward running torque can be achieved. Consequently, it becomes possible to achieve the road wheel drive torque demanded during the electric,(EV) run without resort to the large sizing of first and second motor/generators MG1 and MG2. Thus, the above-described object can be achieved.

After the vehicular forward start, the release of brake ST&EV/B serves to release the fixation of ring gear Rd. The appropriate start of engine 3 permits the drive of the road wheels through the engine output. Thereafter, with the motor drive of first motor/generator MG1 stopped, the gear shift state is varied from the shift state shown by lever ST/EV in FIG. 6B toward that shown by lever MAX in FIG. 6B. When the revolution of first motor/generator MG1 functions as the generator while the revolution of first motor/generator MG1 is reduced toward zero, the generated output of first motor/ generator MG1 serves to drive second motor/generator MG2 so that the vehicular run with the power income and outgo balanced can be achieved.

It is noted that, during the vehicular deceleration requiring the large engine braking when the vehicle is running in the forward directions, the re-clutching of brake causes the revolution of engine 3 to be forcefully reduced via ring gear Rd. Hence, the large engine braking as demanded in accordance with the magnitude of the re-clutching of brake ST&EV/B can be obtained.

Next, the (gear) shift operation during the backward (reverse) revolution output state will be described. When the vehicle is started in the backward direction, as shown by lever REV on the lever diagram of FIG. 6B, the clutching of brake ST&EV/B causes ring gear Rd to be fixed. Under this state, second motor/generator MG2 is driven in the reverse revolution output direction and first motor/generator MG1 is driven in the positive revolution output direction so that the revere rotation of output (Out) is developed. When the vehicle is started to run in the backward direction in the electric (EV) run, lever REV serves to amplify the output torque of each of first and second motor/generators MG1 and MG2 at the lever ratio with ring gear Rd as the fulcrum, with sun gears Sd and Ss power points, and with carrier C as the point of application. The amplified torque can be directed toward output (Out). The backward vehicular run with the large backward running torque can, thus, become possible. In this case, the realization of road wheel drive torque as demanded during the electric (EV) run can be achieved without resort to the large sizing of the first and second motor/generators MG1 and MG2. Thus, the above-described object of the present invention can be achieved.

In the case of hybrid transmission according to the present invention in this embodiment, the (gear) shift control described with reference to FIGS. 7A through 10 can also be carried out in this embodiment. Thus, the same action and advantages as described in the first embodiment can also be achieved in the sixth embodiment.

Although, in each of the first, second, third, fourth, fifth, and sixth embodiments, first and second motor/generators MG1 and MG2 provide the coaxial arrangement of two-layer motor 4 using the compound current, other types of first and second motor/generators may be used. For example, an axial line of first motor/generator MG1 may be differently arranged from that of second motor/generator MG2. It is noted that, in each lever diagram of FIGS. 1B, 2B, 3B, 4B, 5B, and 6B, the forward rotation corresponds to the positive revolution output direction and the backward rotation corresponds to the reverse revolution output direction.

The entire contents of a Japanese Patent Application No. 2002-158807 (filed in Japan on May 31, 2002) are herein incorporated by reference. Various changes and modification may be made without departing from the sprit and the scope of the present invention. The scope of the invention is defined with reference to the following claims.

What is claimed is:

1. A hybrid transmission comprising:
   a two-degree of freedom differential unit including four or more rotary members and structured in such a way that, when revolution states of two rotary members from among the four or more rotary members are determined, the revolution states of the other rotary members are determined;
   a coupling section that sequentially couples the respective rotary members, in a higher revolution speed order, to one motor/generator, to one of an output to a drive system and an input from a main power source, to the other of the output and input, and to another motor/generator; and a brake installed to fix one of the rotary members which is coupled to the input from the main power source, wherein, during a vehicle start, the brake is engaged to fix the rotary member coupled to the input and respective motors are driven for both of the motor/generators to generate torques of a same direction to the output.

2. A hybrid transmission as claimed in claim 1, wherein the two-degree of freedom differential unit comprises a Ravigneaux planetary gear set which is a combination of a single pinion planetary gear group and a double pinion planetary gear group, the input from the main power source is coupled to a common carrier of the Ravigneaux planetary gear set, the double pinion planetary gear group being arranged at a position that is closer to the input from the main power source than a position of the single pinion planetary gear group, each of sun gears of both of the single and double pinion planetary gear groups being coupled to a corresponding one of the one and the other motor/generators, ring gear of the single pinion planetary gear group being coupled to an output gear constituting the output to the drive system, and the brake being coupled to the common carrier to which the input from the main power source is coupled.

3. A hybrid transmission as claimed in claim 1, wherein the two-degree of freedom differential unit comprises a Ravigneaux planetary gear set which is a combination of a single pinion planetary gear group and a double pinion planetary gear group, the input from the main power source is coupled to a common carrier to the Ravigneaux planetary gear set, the single pinion planetary gear group being arranged at a position that is closer to the input from the main power source than a position of the double pinion planetary gear group, each of sun gears of both of the single and double pinion planetary gear groups being coupled to a corresponding one of the one and other motor/generators, a ring gear of the single pinion planetary gear group being coupled to an output gear constituting the output to the drive system, and the brake being coupled to the common carrier to which the input from the main power source is coupled.

4. A hybrid transmission as claimed in claim 1, wherein the two-degree of freedom differential unit comprises a Ravigneaux planetary gear set which is a combination of a single pinion planetary gear group and a double pinion planetary gear group, the double pinion planetary gear group being arranged at a position that is closer to the input from the main power source than a position of the single pinion planetary gear group, each of sun gears of both of the single and double pinion planetary gear groups being coupled to a corresponding one of the one and the other motor/generators, a ring gear of the double pinion planetary gear group being coupled to the input from the main power source and being coupled to the brake, and an output gear constituting the output to the drive system being coupled to the ring gear of the single pinion planetary gear group.

5. A hybrid transmission as claimed in claim 1, wherein the two-degree of freedom differential unit comprises a Ravigneaux planetary gear set which is a combination of a single pinion planetary gear group and a double pinion planetary gear group, the single pinion planetary gear group being arranged at a position that is closer to the input from the main power source than a position of the double pinion planetary gear group, each of sun gears of both of the single and double pinion planetary gear groups being coupled to a corresponding one of the one and the other motor/generators, a ring gear of the single pinion planetary gear group being coupled to the input from the main power source and being coupled to the brake, and a ring gear of the double pinion planetary gear group being coupled to an output gear constituting the output to the drive system.

6. A hybrid transmission as claimed in claim 1, wherein the two-degree of freedom differential unit comprises a Ravigneaux planetary gear set which is a combination of a single pinion planetary gear group and a double pinion planetary gear group, the single pinion planetary gear group being arranged at a position that is closer to the input from the main power source than a position of the double pinion planetary gear group, each of sun gears of both of the single and double pinion planetary gear groups being coupled to a corresponding one of the one and the other motor/generators, a ring gear of the single pinion planetary gear group being coupled to the input from the main power source and being coupled to the brake, and a carrier common to the Ravigneaux planetary gear set being coupled to an output gear constituting the output to the drive system.

7. A hybrid transmission as claimed in claim 1, wherein the two-degree of freedom differential unit comprises a Ravigneaux planetary gear set which is a combination of a single pinion planetary gear group and a double pinion planetary gear group, the double pinion planetary gear group being arranged at a position that is closer to the input from the main power source than a position of the single pinion planetary gear group, each of sun gears of both of the single and double pinion planetary gear groups being coupled to a corresponding one of the one and the other motor/generators, the ring gear of the double pinion planetary gear group being coupled to the input from the main power source and being coupled to the brake, and an output gear constituting the output to the drive system being coupled to the common carrier of the Ravigneaux planetary gear set.

8. A hybrid transmission as claimed in claim 1, wherein the brake is clutched during a start of a vehicle in which the hybrid transmission is mounted to fix one of the rotary members which is coupled to the input from the main power source.

9. A hybrid transmission as claimed in claim 1, wherein the brake is clutched when a vehicle in which the hybrid transmission is mounted runs only by means of the output from one of the one and the other motor/generators without resort to the main power source to fix one of the rotary members which is coupled to the input from the main power source.

10. A hybrid transmission as claimed in claim 1, wherein, when the brake is clutched, both of the one and the other motor/generators are driven to develop a torque in the same direction at the output.

11. A hybrid transmission as claimed in claim 1, wherein the brake is clutched during a deceleration of a vehicle in which the hybrid transmission is mounted.

12. A hybrid transmission as claimed in claim 1, wherein both of the motor/generators are constituted by a compound current two-layer motor including a common annular stator, an inner rotor arranged on an inner periphery of the stator, and an outer rotor arranged on an outer periphery of the stator.

13. A hybrid transmission as claimed in claim 2, wherein the rotary members of the two-degree of freedom differential unit comprises: the sun gear of the double pinion planetary gear group; the ring gear of the single pinion planetary gear group; the carrier; and the sun gear of the single pinion planetary gear group, in the higher revolution speed order, when a vehicle in which the hybrid transmission is mounted is started to run in a forward direction, the brake is clutched to fix the carrier, the one motor/generator coupled to the sun gear of the single pinion planetary gear group is driven in a reverse revolution output direction and the other motor/generator coupled to the sun gear of the double pinion planetary gear group is driven in a positive revolution output direction to develop a positive directional revolution at the output and an output torque of each of the one and the other motor/generators is amplified and the amplified torque is enabled to be directed toward the output at a ratio of a lever determined with the carrier as a fulcrum, with the sun gears as power points, and with the ring gear coupled to the output as a point of application, and, after the vehicle is started to run in the forward direction, the brake is released to release the fixation of the carrier so as to enable a vehicular run with an output of the main power source.

14. A hybrid transmission as claimed in claim 13, wherein, when the vehicle is started to run in a backward direction, a clutching of the brake causes the carrier to be fixed and the other motor/generator coupled to the sun gear of the double pinion planetary gear group is driven in the reverse revolution output direction and the one motor/generator coupled to the sun gear of the single pinion planetary carrier is driven in the positive revolution output direction to develop the reverse revolution at the output, and the output torque of each of the one and the other motor/generators is amplified, and the amplified output is enabled to be directed toward the output at a ratio of another lever determined with the carrier as the fulcrum, with the sun gears as the power points, and with ring gear of the single pinion planetary gear group as the point of application.

15. A hybrid transmission as claimed in claim 3, wherein the rotary members of the two-degree of freedom differential unit comprises: the sun gear of the single pinion planetary gear group; the sun gear of the double pinion planetary gear group; the ring gear of the single pinion planetary gear group; the carrier; the ring gear Rd of the double pinion planetary gear group; and the sun gear Ss of the single pinion planetary gear group, in the higher revolution speed order, when a vehicle in which the hybrid transmission is mounted is started to run in a forward direction, a clutching of the brake causes the carrier to be fixed, the one motor/generator coupled to the sun gear of the double pinion planetary gear group is driven in a reverse revolution output direction and the other motor/generator coupled to the sun gear of the single pinion planetary gear group is driven in a positive revolution output direction at the output coupled to the ring gear of the double pinion planetary gear group and an output torque of each of the one and the other motor/generators is amplified and the amplified output is enabled to be directed toward the output at a ratio of a lever determined with the carrier as a fulcrum, with the sun gears as power points, and with the ring gear of the double pinion planetary gear group as the point of application, after the vehicle is started to run in the forward direction, a release of the brake causes a fixation of the carrier to be released to enable a vehicular run with an output of the main power source, and, when the vehicle is started to run in a backward direction, a clutching of the brake causes the carrier C to be fixed, the one motor/generator is driven in the positive revolution output direction and the other motor/generator is driven in the reverse revolution output direction to develop a reverse directional output at the output coupled to the ring gear of the double pinion planetary gear group and an output torque of each of the one and the other motor/generators is ampli- fied and the amplified torque is enabled to be directed toward the output at a ratio of another lever determined with the carrier as the fulcrum, with the sun gears as power points, and with the ring gear of the double pinion planetary gear group as the point of application.

16. A hybrid transmission as claimed in claim 4, wherein the rotary members of the two-degree of freedom differential unit comprises: the sun gear of the double pinion planetary gear group; the ring gear of the single pinion planetary gear group; the carrier; the ring gear of the double pinion planetary gear group; and the sun gear of the single pinion planetary gear group, in the higher revolution speed order, when a vehicle in which the hybrid transmission is mounted is started to run in a forward direction, the brake is clutched to fix the ring gear of the double pinion planetary gear group, the one motor/generator coupled to the sun gear of the double pinion planetary gear group is driven in a positive revolution output direction and the other motor/generator coupled to the sun gear of the single pinion planetary gear group is driven in a reverse revolution output direction to develop a positive directional revolution at the output coupled to the ring gear of the single planetary pinion gear group and an output torque of each of the one and the other motor/generators is amplified and the amplified torque is enabled to be directed toward the output at a ratio of a lever determined with the ring gear of the double pinion planetary gear group as a fulcrum, with the sun gears as power points, with the ring gear of the single pinion planetary gear group as the point of application, after the vehicle is started to run in the forward direction, the brake is released to release the fixation of the ring gear of the double pinion planetary gear group to enable a vehicular run with an output of the main power source, and, when the vehicle is started to run in a backward direction, a clutching of the brake causes the ring gear of the double pinion planetary gear group to be fixed and the one motor/generator coupled to the sun gear of the double pinion planetary gear group is driven in the reverse revolution output direction and the other motor/generator coupled to the sun gear of the single pinion planetary gear group is driven in the positive revolution output direction to develop a reverse directional output at the output and an output torque of each of the one and the other motor/generators is amplified and the amplified torque is enabled to be directed toward the output coupled to ring gear of the single pinion planetary gear group at a ratio of another lever determined with the ring gear of the double pinion planetary gear group as the fulcrum, with the sun gears as the power points, and with the ring gear of the single pinion planetary carrier as the point of application.

17. A hybrid transmission as claimed in claim 5, wherein the rotary members of the two-degree of freedom differential unit comprises: the sun gear of the double pinion planetary gear group; the ring gear of the single pinion planetary gear group; the carrier; the ring gear of the double pinion planetary gear group; and the sun gear of the single pinion planetary gear group, in the higher revolution speed order, when a vehicle in which the hybrid transmission is mounted is started to run in a forward direction, the brake is clutched to fix the ring gear of the single pinion planetary gear group, the one motor/generator coupled to the sun gear of the double pinion planetary gear group is driven in a reverse revolution output direction and the other motor/generator coupled to the sun gear of the single pinion planetary gear group is driven in a positive revolution output direction to develop a positive directional revolution at the output coupled to the ring gear of the double pinion planetary gear group and an output torque of each of the one and the other motor/generators is amplified and the amplified torque is enabled to be directed toward the output at a ratio of a lever determined with the ring gear of the single pinion planetary gear group as a fulcrum, with the sun gears as power points, and with the ring gear of the double pinion planetary gear group as the point of application, after the vehicle is started to run in the forward direction, the brake is released to release a fixation of the ring gear of the single pinion planetary gear group to enable a vehicular run with an output of the main power source, and, when the vehicle is started to run in a backward direction, a clutching of the brake causes the ring gear of the single pinion planetary gear group to be fixed and the one motor/generator coupled to the sun gear of the double pinion planetary gear group is driven in the positive revolution output direction and the other motor/generator coupled to the sun gear of the single pinion planetary gear group is driven in the reverse revolution output direction to develop a reverse revolution at the output coupled to the ring gear of the double pinion planetary gear group and an output torque of each of the one and the other motor/generators is amplified and the amplified torque is enabled to be directed toward the output coupled to the ring gear of the double pinion planetary gear group at a ratio of another lever determined with the ring gear of the single pinion planetary gear group as the fulcrum, with the sun gears as the power points, with the ring gear of the double pinion planetary carrier as the point of application.

18. A hybrid transmission as claimed in claim 6, wherein the rotary members of the two-degree of freedom differential unit comprises: the sun gear of the double pinion planetary gear group; the ring gear of the single pinion planetary gear group; the carrier; the ring gear of the double pinion planetary gear group; and the sun gear of the single pinion planetary gear group, in the higher revolution speed order, when a vehicle in which the hybrid transmission is mounted is started to run in a forward direction, the brake is clutched to fix the ring gear of the single pinion planetary gear group, the one motor/generator coupled to the sun gear of the single pinion planetary gear group is driven in a positive revolution output direction and the other motor/generator coupled to the sun gear of the double pinion planetary gear group is driven in a reverse revolution output direction to develop a positive directional revolution at the output coupled to the carrier and an output torque of each of the one and the other motor/generators is amplified and the amplified torque is enabled to be directed toward the output via the carrier at a ratio of a lever determined with the ring gear of the single pinion planetary gear group as a fulcrum, with the sun gears as power points, and with the carrier as the point of application, after the vehicle is started to run in the forward direction, the brake is released to release a fixation of the ring gear of the single pinion planetary gear group to enable a vehicular run with an output of the main power source, and when the vehicle is started to run in a backward direction, a clutching of the brake causes the ring gear of the single pinion planetary gear group to be fixed and the one motor/generator coupled to the sun gear of the single pinion planetary gear group is driven in the reverse revolution output direction and the other motor/generator coupled to the sun gear of the double pinion planetary gear group is driven in the positive revolution output direction to develop a reverse revolution at the output coupled to the carrier and an output torque of each of the one and the other motor/generators is amplified and the amplified torque is enabled to be directed toward the output coupled to the carrier at a ratio of another lever determined with the ring gear of the single pinion planetary gear group as the fulcrum, with the sun gears as the power points, and with the carrier as the point of application.

19. A hybrid transmission as claimed in claim 7, wherein the rotary members of the two-degree of freedom differential unit comprises: the sun gear of the double pinion planetary gear group; the ring gear of the single pinion planetary gear group; the carrier; the ring gear of the double pinion planetary gear group; and the sun gear of the single pinion planetary gear group, in the higher revolution speed order, when a vehicle in which the hybrid transmission is mounted is started to run in a forward direction, the brake is clutched to fix the ring gear of the double pinion planetary gear group, the one motor/generator coupled to the sun gear of the single pinion planetary gear group is driven in a reverse revolution output direction and the other motor/generator coupled to the sun gear of the double pinion planetary gear group is driven in a reverse revolution output direction to develop a positive directional revolution at the output coupled to the carrier and an output torque of each of the one and the other motor/generators is amplified and the amplified torque is enabled to be directed toward the output via the carrier at a ratio of a lever determined with the ring gear of the double pinion planetary gear group as a fulcrum, with the sun gears as power points, with the carrier as a point of application, after the vehicle is started to run in the forward direction, the brake is released to release a fixation of the ring gear of the double pinion planetary gear group to enable a vehicular run with an output of the main power source, and, when the vehicle is started to run in a backward direction, a clutching of the brake causes the ring gear of the double pinion planetary gear group to be fixed and the one motor/generator coupled to the sun gear of the single pinion planetary gear group is driven in the positive revolution output direction and the other motor/generator coupled to the sun gear of the double pinion planetary gear group is driven in the reverse revolution output direction to develop a reverse revolution at the output coupled to the carrier and an output torque of each of the one and the other motor/generators is amplified and the amplified torque is enabled to be directed toward the output coupled to the carrier at a ratio of another lever determined with the ring gear of the double pinion planetary gear group as the fulcrum, with the sun gears as the power points, and with the carrier as the point of application.

20. A method applicable to a hybrid transmission, the hybrid transmission comprising a two-degree of freedom differential unit including four or more rotary members and structured in such a way that, when revolution states of two rotary members from among the four or more rotary members are determined, the revolution states of the other rotary members are determined and the method comprising;

sequentially coupling the respective rotary members, in a higher revolution speed order, to one motor/generator, to one of an output to a drive system and an input from a main power source, to the other of the output and input, and to another motor/generator; and installing a brake to fix one of the rotary members which is coupled to the input from the main power source, wherein during a vehicle start, the brake is engaged to fix the rotary member coupled to the input and respective motors are driven for both of the motor/generators to generate torques of a same direction to the output.

* * * * *

UNITED STATES PATENT AND TRADEMARK OFFICE
CERTIFICATE OF CORRECTION

PATENT NO. : 7,001,296 B2  
APPLICATION NO. : 10/445846  
DATED : February 21, 2006  
INVENTOR(S) : Yasuhiro Yamauchi et al.

It is certified that error appears in the above-identified patent and that said Letters Patent is hereby corrected as shown below:

ON THE TITLE PAGE OF PATENT line 1

(*)    Notice: This patent is subject to a terminal disclaimer.

Signed and Sealed this

Twenty-second Day of August, 2006

JON W. DUDAS  
*Director of the United States Patent and Trademark Office*